US012603055B2

(12) United States Patent
Lee et al.

(10) Patent No.: US 12,603,055 B2
(45) Date of Patent: Apr. 14, 2026

(54) DISPLAY DEVICE INCLUDING A SWEEP DRIVER THAT PROVIDES A SWEEP SIGNAL, AND ELECTRONIC DEVICE INCLUDING THE DISPLAY DEVICE

(71) Applicant: Samsung Display Co., LTD., Yongin-si (KR)

(72) Inventors: Sehyun Lee, Yongin-si (KR); Dongwoo Kim, Yongin-si (KR); Junghwan Hwang, Yongin-si (KR); Kwihyun Kim, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 19/025,374

(22) Filed: Jan. 16, 2025

(65) Prior Publication Data

US 2025/0336353 A1 Oct. 30, 2025

(30) Foreign Application Priority Data

Apr. 25, 2024 (KR) ........................ 10-2024-0055262

(51) Int. Cl.
*G09G 3/22* (2006.01)
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/066* (2013.01); *G09G 2310/08* (2013.01); *G09G 2320/0242* (2013.01); *G09G 2320/064* (2013.01)

(58) Field of Classification Search
CPC ..... G09G 3/30–3233; G09G 2310/066; G09G 2320/064
See application file for complete search history.

(56) References Cited

U.S. PATENT DOCUMENTS

2023/0186836 A1* 6/2023 Jeong ........................ G09G 3/32 345/55
2024/0038170 A1* 2/2024 Zhai ...................... G09G 3/3233

FOREIGN PATENT DOCUMENTS

KR 10-2022-0052265 4/2022

* cited by examiner

*Primary Examiner* — Sanghyuk Park
(74) *Attorney, Agent, or Firm* — CANTOR COLBURN LLP

(57) ABSTRACT

Provided is a display device including a display panel including a plurality of pixels, a data driver which provides a data voltage to each of the plurality of pixels, a scan driver which provides a scan signal to each of the plurality of pixels, a sweep driver which provides a sweep signal to each of the plurality of pixels, and a controller. Each pixel includes a light emitting element, a pulse width modulation circuit which receives the data voltage in response to the scan signal, and generates a pulse width modulation signal based on the data voltage and the sweep signal, and a current generation circuit which provides a current to the light emitting element based on the pulse width modulation signal. A slope of the sweep signal is changed in a plurality of modes having different maximum luminances.

20 Claims, 18 Drawing Sheets

DISPLAY DEVICE INCLUDING A SWEEP DRIVER THAT PROVIDES A SWEEP SIGNAL, AND ELECTRONIC DEVICE INCLUDING THE DISPLAY DEVICE

CROSS-REFERENCE TO RELATED APPLICATION(S)

This application claims priority to and benefits of Korean Patent Application No. 10-2024-0055262 under 35 U.S.C. § 119, filed on Apr. 25, 2024 in the Korean Intellectual Property Office, the entire contents of which are incorporated herein by reference.

BACKGROUND

1. Technical Field

The disclosure generally relates to a display device, and more particularly to a display device capable of driving a light emitting element in a pulse width modulation (PWM) method.

2. Description of the Related Art

A display device may display an image by driving a light emitting element, such as a micro light emitting diode (μLED) or an organic light emitting diode (OLED), in a pulse amplitude modulation (PAM) method or a pulse width modulation (PWM) method. In the PAM method, a gray level may be represented by adjusting an amount (or an amplitude) of a driving current provided to the light emitting element. In the PWM method, the gray level may be represented by adjusting a time (or a pulse width) during which the driving current is provided to the light emitting element.

A wavelength of light emitted by the μLED may be shifted according to the amount of the driving current. Thus, in a case where the light emitting element such as the μLED is driven in the PAM method, a color shift phenomenon may occur, and the image may be distorted.

SUMMARY

Some embodiments provide a display device capable of improving image quality.

According to embodiments, there is provided a display device including a display panel including a plurality of pixels, a data driver which provides a data voltage to each of the plurality of pixels, a scan driver which provides a scan signal to each of the plurality of pixels, a sweep driver which provides a sweep signal to each of the plurality of pixels, and a controller which controls the data driver, the scan driver and the sweep driver. Each of the plurality of pixels includes a light emitting element, a pulse width modulation circuit which receives the data voltage in response to the scan signal and generates a pulse width modulation signal based on the data voltage and the sweep signal, and a current generation circuit which provides a current to the light emitting element based on the pulse width modulation signal. A slope of the sweep signal is changed in a plurality of modes having different maximum luminances.

In embodiments, the plurality of modes may include a first mode having a first maximum luminance, and a second mode having a second maximum luminance lower than the first maximum luminance. The sweep signal may have a first slope in the first mode, and may have a second slope having an absolute value greater than an absolute value of the first slope in the second mode.

In embodiments, the sweep signal may gradually change in a sweep period in each frame period, and the sweep period may have different time lengths in the plurality of modes.

In embodiments, the plurality of modes may include a first mode having a first maximum luminance, and a second mode having a second maximum luminance lower than the first maximum luminance. The sweep period may have a first time length in the first mode, and may have a second time length shorter than the first time length in the second mode.

In embodiments, in the first mode, the sweep signal may gradually change from a first voltage level to a second voltage level during the sweep period having the first time length. In the second mode, the sweep signal may gradually change from the first voltage level to the second voltage level during the sweep period having the second time length.

In embodiments, the sweep driver may generate the sweep signal based on a sweep clock signal, and the sweep clock signal may have different clock periods in the plurality of modes.

In embodiments, the plurality of modes may include a first mode having a first maximum luminance, and a second mode having a second maximum luminance lower than the first maximum luminance. The sweep clock signal may have a first clock period in the first mode, and may have a second clock period shorter than the first clock period in the second mode.

In embodiments, the plurality of modes may include a high brightness mode (HBM) having a first maximum luminance, a normal mode having a second maximum luminance lower than the first maximum luminance, and an always on display (AOD) mode having a third maximum luminance lower than the second maximum luminance.

In embodiments, the plurality of pixels may include a red pixel, a green pixel and a blue pixel, and a first sweep signal applied to the red pixel, a second sweep signal applied to the green pixel and a third sweep signal applied to the blue pixel may have different slopes.

In embodiments, an absolute value of a slope of the second sweep signal may be greater than an absolute value of a slope of the third sweep signal, and an absolute value of a slope of the first sweep signal may be greater than the absolute value of the slope of the second sweep signal.

According to embodiments, there is provided a display device including a display panel including a red pixel, a green pixel and a blue pixel, a data driver which provides a data voltage to each of the red pixel, the green pixel and the blue pixel, a scan driver which provides a scan signal to each of the red pixel, the green pixel and the blue pixel, a sweep driver which provides a first sweep signal to the red pixel, provides a second sweep signal to the green pixel, and provides a third sweep signal to the blue pixel, and a controller which controls the data driver, the scan driver, and the sweep driver. Each of the red pixel, the green pixel, and the blue pixel includes a light emitting element, a pulse width modulation circuit which receives the data voltage in response to the scan signal and generates a pulse width modulation signal based on the data voltage and a corresponding one of the first, second, and third sweep signals, and a current generation circuit which provides a current to the light emitting element based on the pulse width modulation signal. The first sweep signal, the second sweep signal and the third sweep signal have different slopes.

In embodiments, an absolute value of a slope of the second sweep signal may be greater than an absolute value of a slope of the third sweep signal, and an absolute value of a slope of the first sweep signal may be greater than the absolute value of the slope of the second sweep signal.

In embodiments, a first sweep period in which the first sweep signal gradually changes, a second sweep period in which the second sweep signal gradually changes, and a third sweep period in which the third sweep signal gradually changes may have different time lengths.

In embodiments, a time length of the second sweep period may be shorter than a time length of the third sweep period, and a time length of the first sweep period may be shorter than the time length of the second sweep period.

In embodiments, the third sweep signal may gradually change from a first voltage level to a second voltage level during the third sweep period, the second sweep signal gradually may change from the first voltage level to the second voltage level during the second sweep period having a time length shorter than a time length of the third sweep period, and the first sweep signal may gradually change from the first voltage level to the second voltage level during the first sweep period having a time length shorter than the time length of the second sweep period.

In embodiments, the sweep driver may generate the first sweep signal based on a first sweep clock signal, may generate the second sweep signal based on a second sweep clock signal, and may generate the third sweep signal based on a third sweep clock signal. The first sweep clock signal, the second sweep clock signal and the third sweep clock signal may have different clock periods.

In embodiments, a clock period of the second sweep clock signal may be shorter than a clock period of the third sweep clock signal, and a clock period of the first sweep clock signal may be shorter than the clock period of the second sweep clock signal.

In embodiments, a slope of each of the first sweep signal, the second sweep signal and the third sweep signal may be changed in a plurality of modes having different maximum luminances.

In embodiments, the plurality of modes may include a first mode having a first maximum luminance, and a second mode having a second maximum luminance lower than the first maximum luminance. Each of the first sweep signal, the second sweep signal and the third sweep signal may have a first slope in the first mode, and may have a second slope having an absolute value greater than an absolute value of the first slope in the second mode.

According to embodiments, there is provided a display device including a display panel including a red pixel, a green pixel and a blue pixel, a data driver which provides a data voltage to each of the red pixel, the green pixel and the blue pixel, a scan driver which provides a scan signal to each of the red pixel, the green pixel and the blue pixel, a sweep driver which provides a first sweep signal having a first slope to the red pixel, to provide a second sweep signal having a second slope different from the first slope to the green pixel, and provides a third sweep signal having a third slope different from the first and second slopes to the blue pixel, and a controller which controls the data driver, the scan driver and the sweep driver. Each of the red pixel, the green pixel and the blue pixel includes a light emitting element, a pulse width modulation circuit which receives the data voltage in response to the scan signal and generates a pulse width modulation signal based on the data voltage and a corresponding one of the first, second and third sweep signals, and a current generation circuit which provides a current to the light emitting element based on the pulse width modulation signal. The first slope of the first sweep signal, the second slope of the second sweep signal and the third slope of the third sweep signal are changed in a plurality of modes having different maximum luminances.

As described above, in a display device according to embodiments, each pixel may emit light based on a sweep signal, and a slope of the sweep signal may be changed in a plurality of modes having different maximum luminances. Accordingly, luminous efficiency of each pixel may be improved, and an image quality of the display device may be improved.

Further, in the display device according to embodiments, a red pixel may emit light based on a first sweep signal, a green pixel may emit light based on a second sweep signal, a blue pixel may emit light based on a third sweep signal, and the first sweep signal, the second sweep signal and the third sweep signal may have different slopes. Accordingly, the luminous efficiency of each of the red, green and blue pixels may be improved, and the image quality of the display device may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
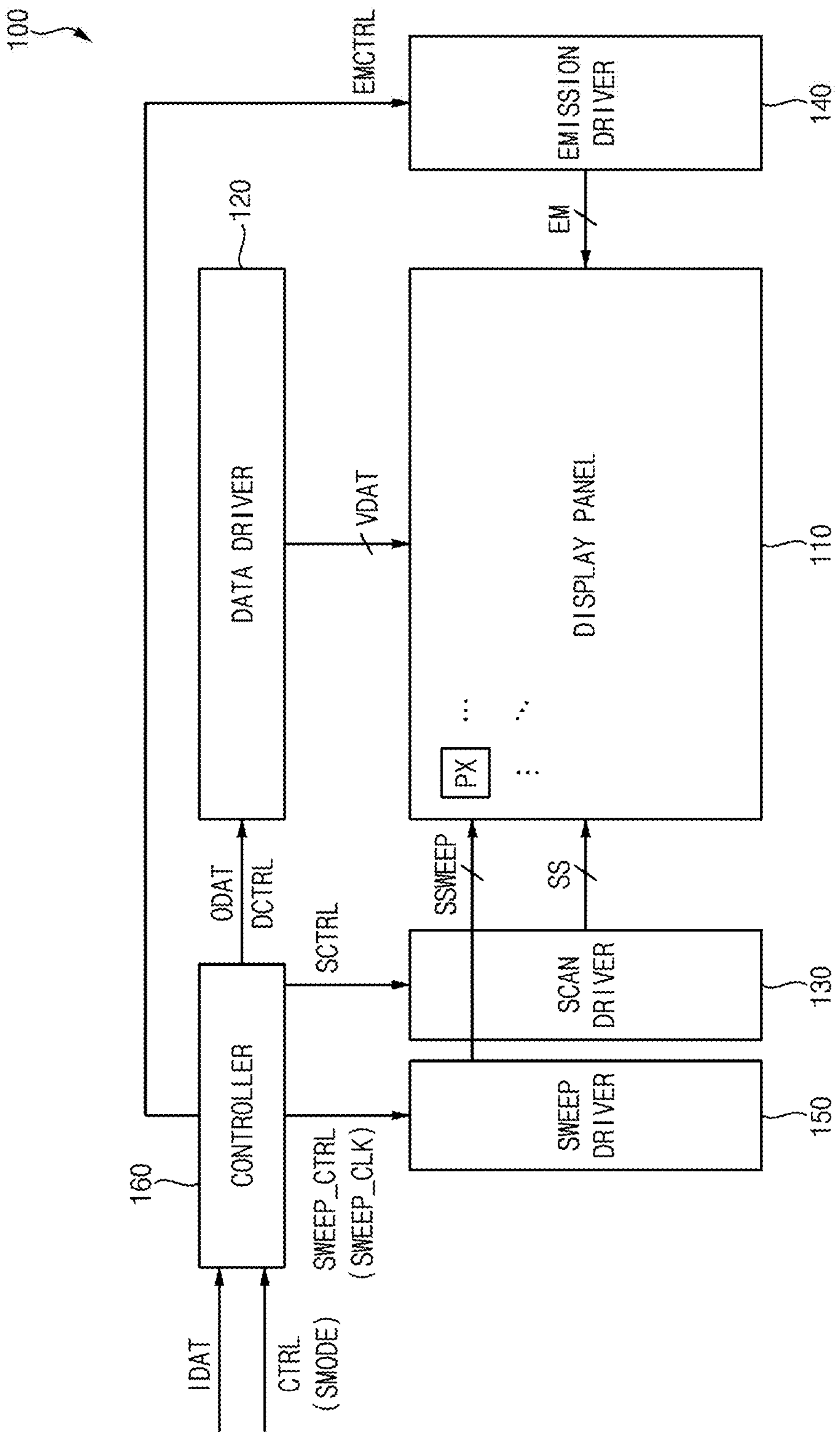
FIG. 1 is a schematic block diagram illustrating a display device according to embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. In case that an embodiment may be implemented differently, a specific process order may be performed differently from the described order. For example, two consecutively described processes may be performed substantially at the same time or performed in an order opposite to the described order. Also, like reference numerals and/or reference characters denote like elements.

In case that an element, such as a layer, is referred to as being "on," "connected to," or "coupled to" another element or layer, it may be directly on, connected to, or coupled to the other element or layer or intervening elements or layers may be present. In case that, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," in case that used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Figure 2:
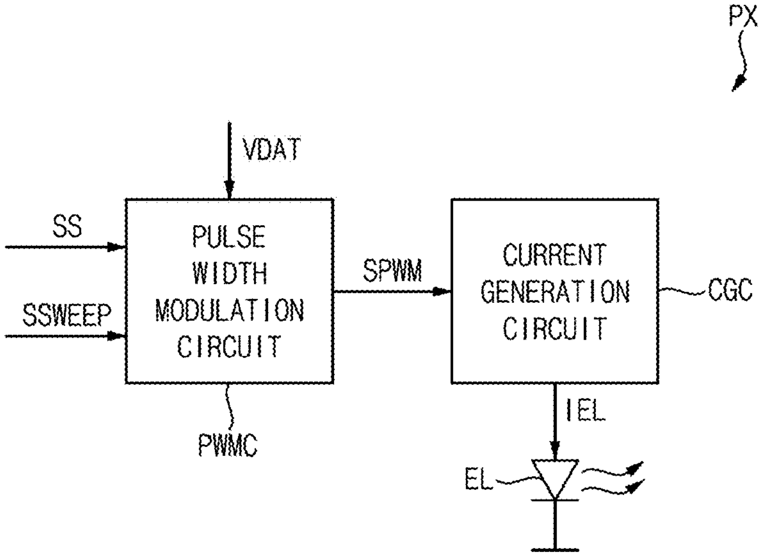
FIG. 2 is a schematic block diagram illustrating a pixel of a display device according to embodiments.
Figure 3:
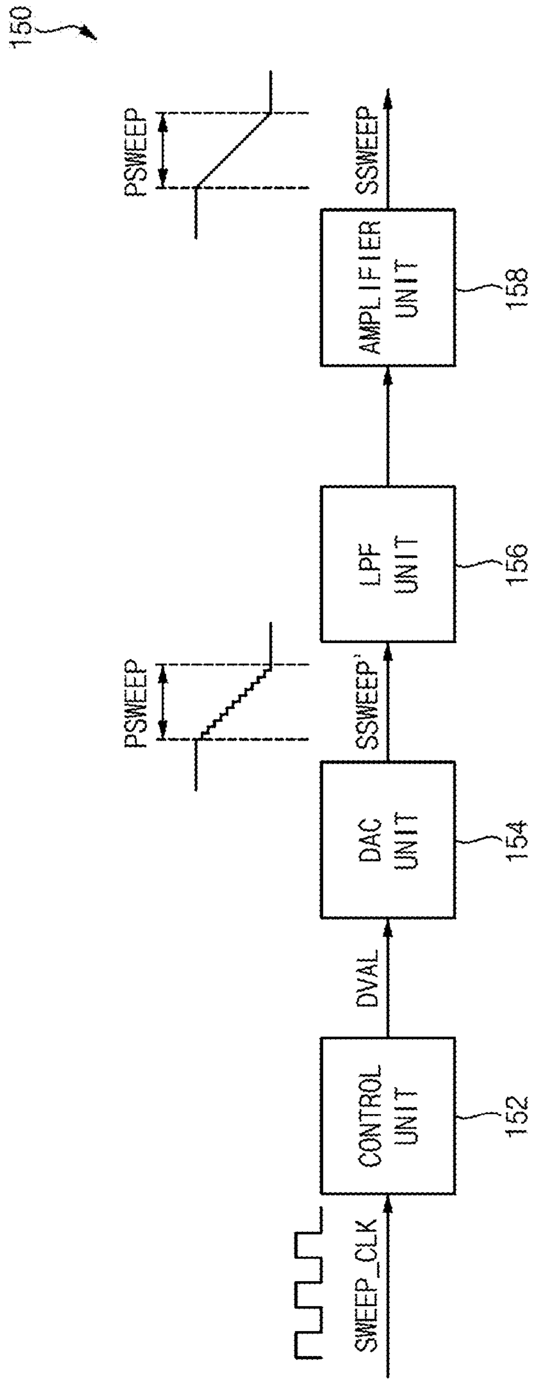
FIG. 3 is a schematic block diagram illustrating an example of a sweep driver included in a display device according to embodiments.
Figure 4:
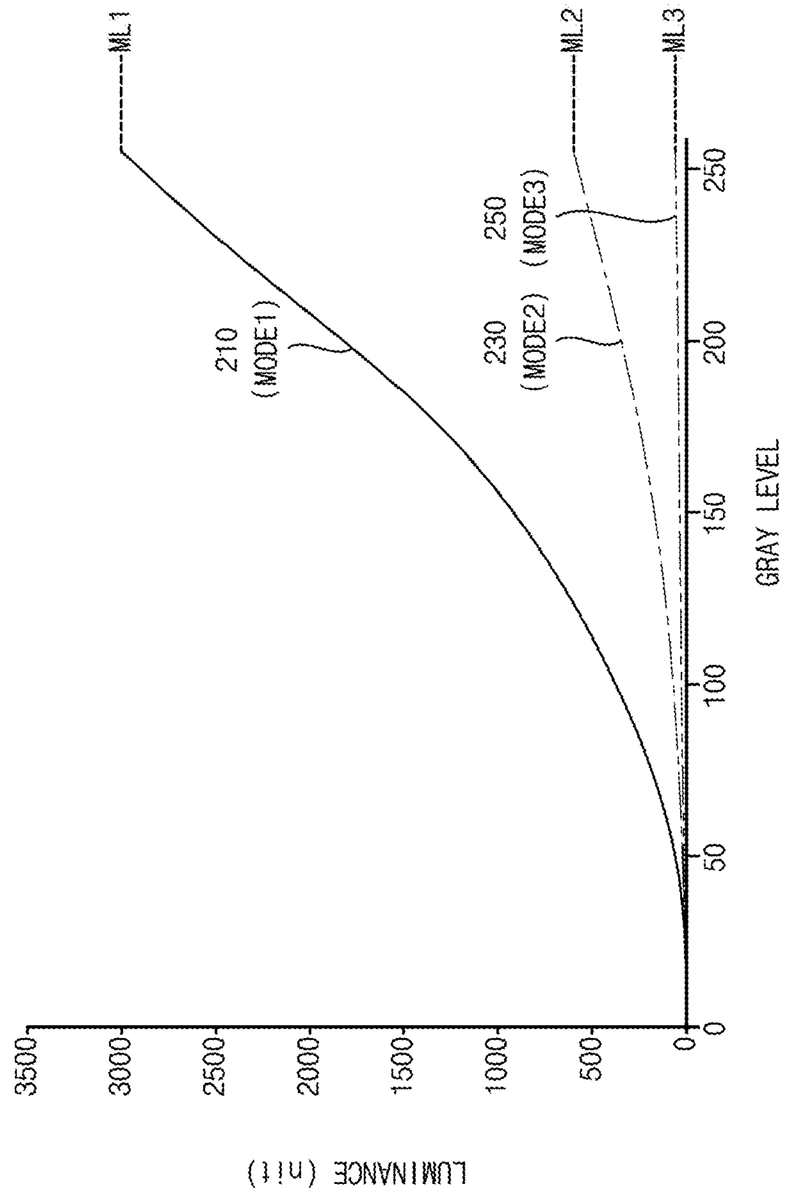
FIG. 4 is a schematic diagram for describing an example of a plurality of modes of a display device according to embodiments.
Figure 5:
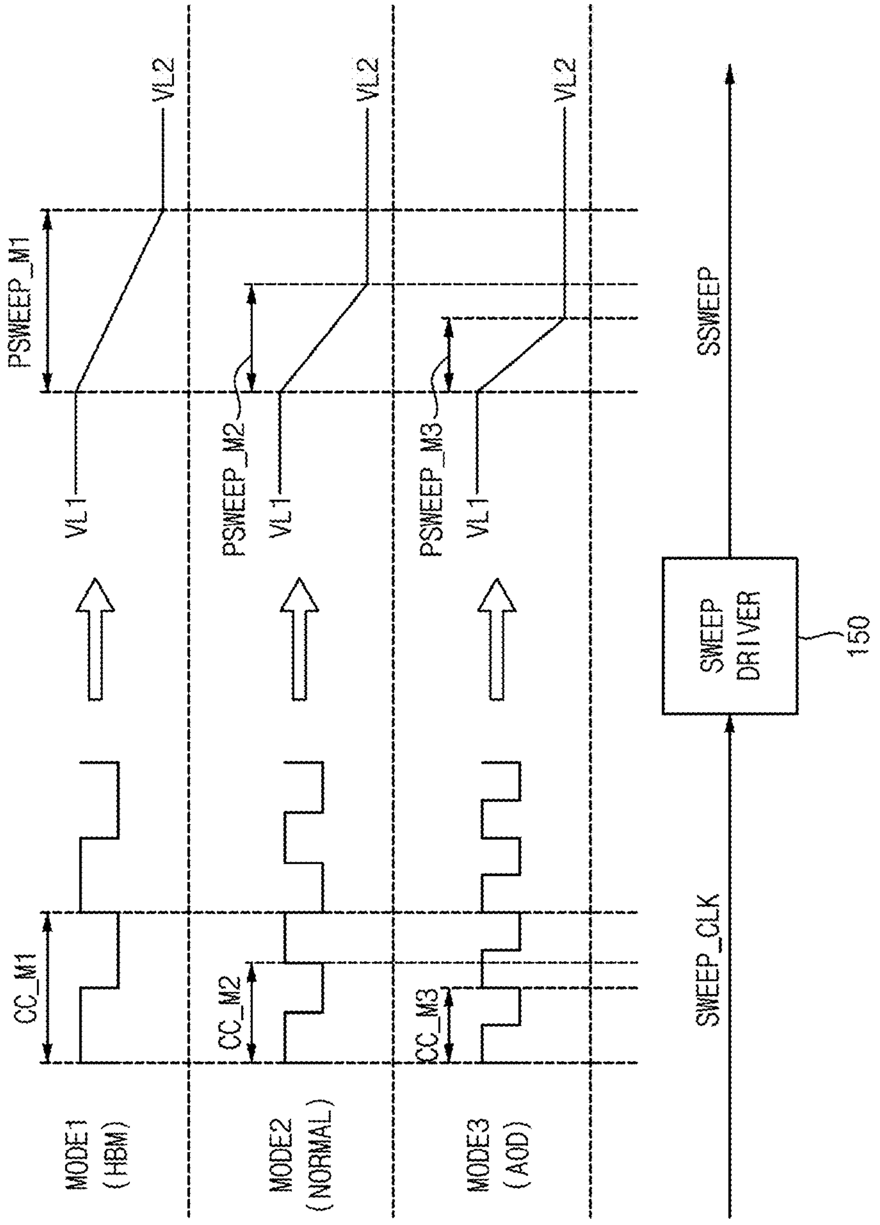
FIG. 5 is a schematic diagram illustrating an example of a sweep clock signal and a sweep signal in a plurality of modes.
Figure 6:
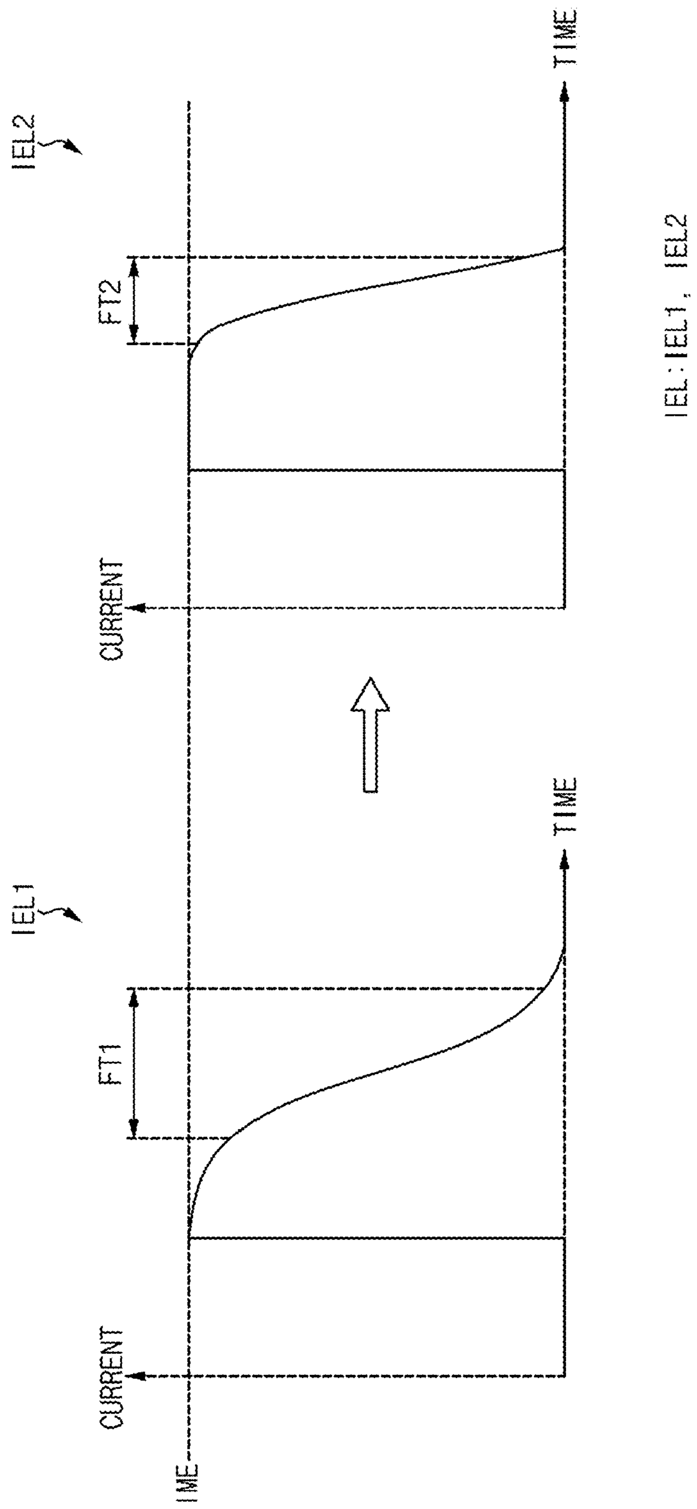
FIG. 6 is a schematic diagram for describing an example of a current of a light emitting element in a display device according to embodiments.

FIG. 1 is a schematic block diagram illustrating a display device according to embodiments, FIG. 2 is a schematic block diagram illustrating a pixel of a display device according to embodiments, FIG. 3 is a schematic block diagram illustrating an example of a sweep driver included in a display device according to embodiments, FIG. 4 is a schematic diagram for describing an example of multiple modes of a display device according to embodiments, FIG. 5 is a schematic diagram illustrating an example of a sweep clock signal and a sweep signal in multiple modes, and FIG. 6 is a schematic diagram for describing an example of a current of a light emitting element in a display device according to embodiments.

Referring to FIG. 1, a display device 100 according to embodiments may include a display panel 110 that includes multiple pixels PX, a data driver 120 that provides a data voltage VDAT to each of multiple pixels PX, a scan driver 130 that provides a scan signal SS to each of multiple pixels PX, a sweep driver 150 that provides a sweep signal SSWEEP to each of multiple pixels PX, and a controller 160 that controls the data driver 120, the scan driver 130, and the sweep driver 150. In other embodiments, the display device 100 may further include an emission driver 140 that provides an emission signal EM to each of multiple pixels PX.

The display panel 110 may include multiple pixels PX arranged in multiple rows and multiple columns. In other embodiments, as illustrated in FIG. 2, each pixel PX may include a pulse width modulation circuit PWMC, a current generation circuit CGC, and a light emitting element EL. The pulse width modulation circuit PWMC may receive the data voltage VDAT in response to the scan signal SS, and may generate a pulse width modulation signal SPWM based on the data voltage VDAT and the sweep signal SSWEEP. The current generation circuit CGC may provide a current IEL to the light emitting element EL based on the pulse width modulation signal SPWM. The light emitting element EL may emit light based on the current IEL provided by the current generation circuit CGC. In other embodiments, the light emitting element EL may be, but is not limited to, a micro light emitting diode (μLED). In other embodiments, the light emitting element EL may be an organic light emitting diode (OLED). In still other embodiments, the light emitting element EL may be a nano light emitting diode (NED), a quantum dot (QD) light emitting diode, an inorganic light emitting diode, or any other suitable light emitting element.

The data driver 120 may provide the data voltages VDAT to multiple pixels PX based on output image data ODAT and a data control signal DCTRL received from the controller 160. In other embodiments, the data control signal DCTRL may include, but is not limited to, an output data enable signal, a horizontal start signal, and a load signal. In other embodiments, the data voltage VDAT may be provided to the pulse width modulation circuit PWMC of each pixel PX, but is not limited thereto. In other embodiments, as illustrated in FIGS. 7 through 11, the data voltage VDAT provided to each pixel PX may include a pulse width modulation data voltage PWM_VDAT provided to the pulse width modulation circuit PWMC, and a current generation data voltage CG_VDAT provided to the current generation circuit CGC. In other embodiments, the data driver 120 and the controller 160 may be implemented as a single integrated circuit, and the single an integrated circuit may be referred to as a timing controller embedded data driver (TED). In other embodiments, the data driver 120 and the controller 160 may be implemented as separate integrated circuits.

Figure 7:
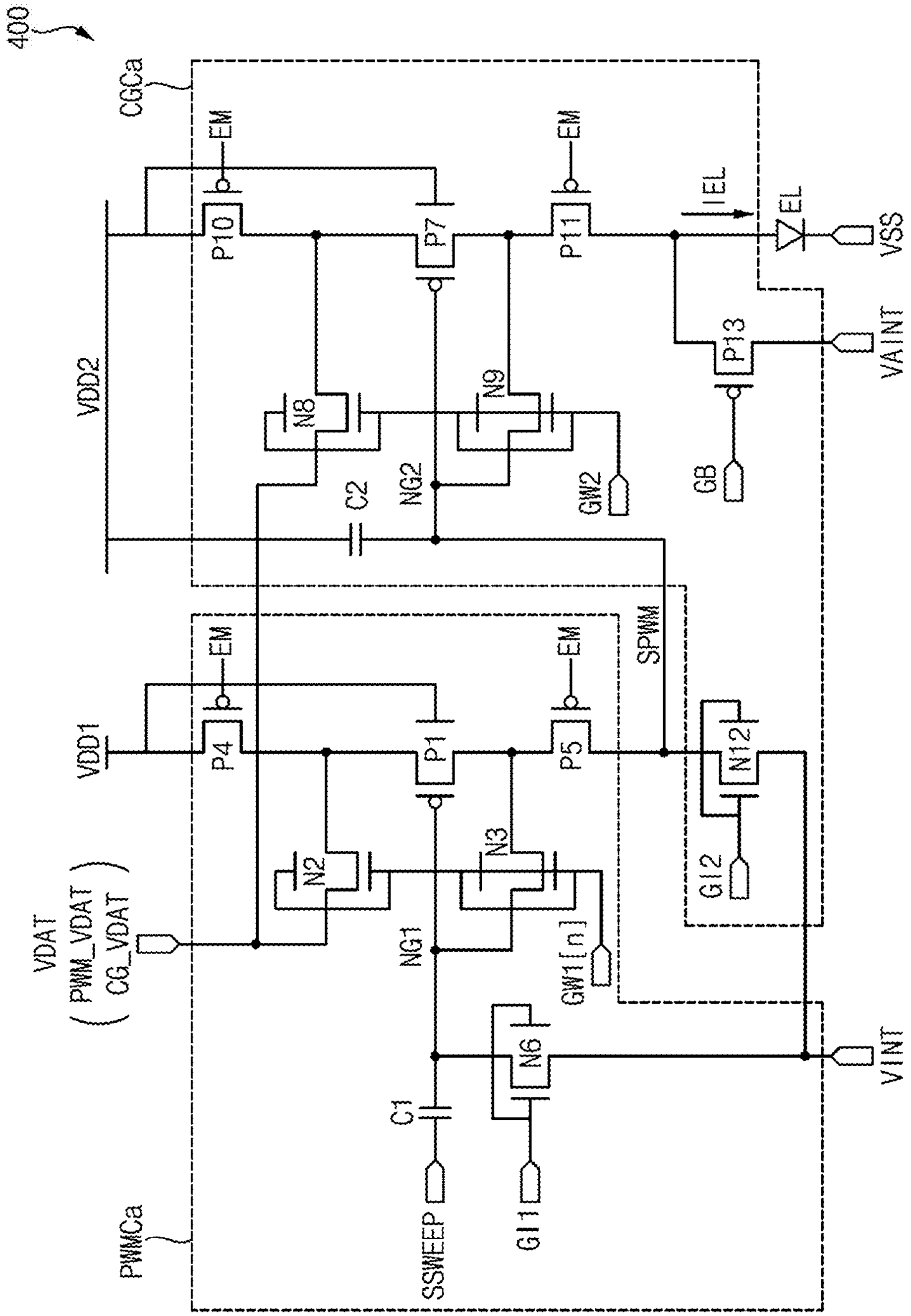
FIG. 7 is a schematic diagram of an equivalent circuit illustrating a pixel according to embodiments.
Figure 8:
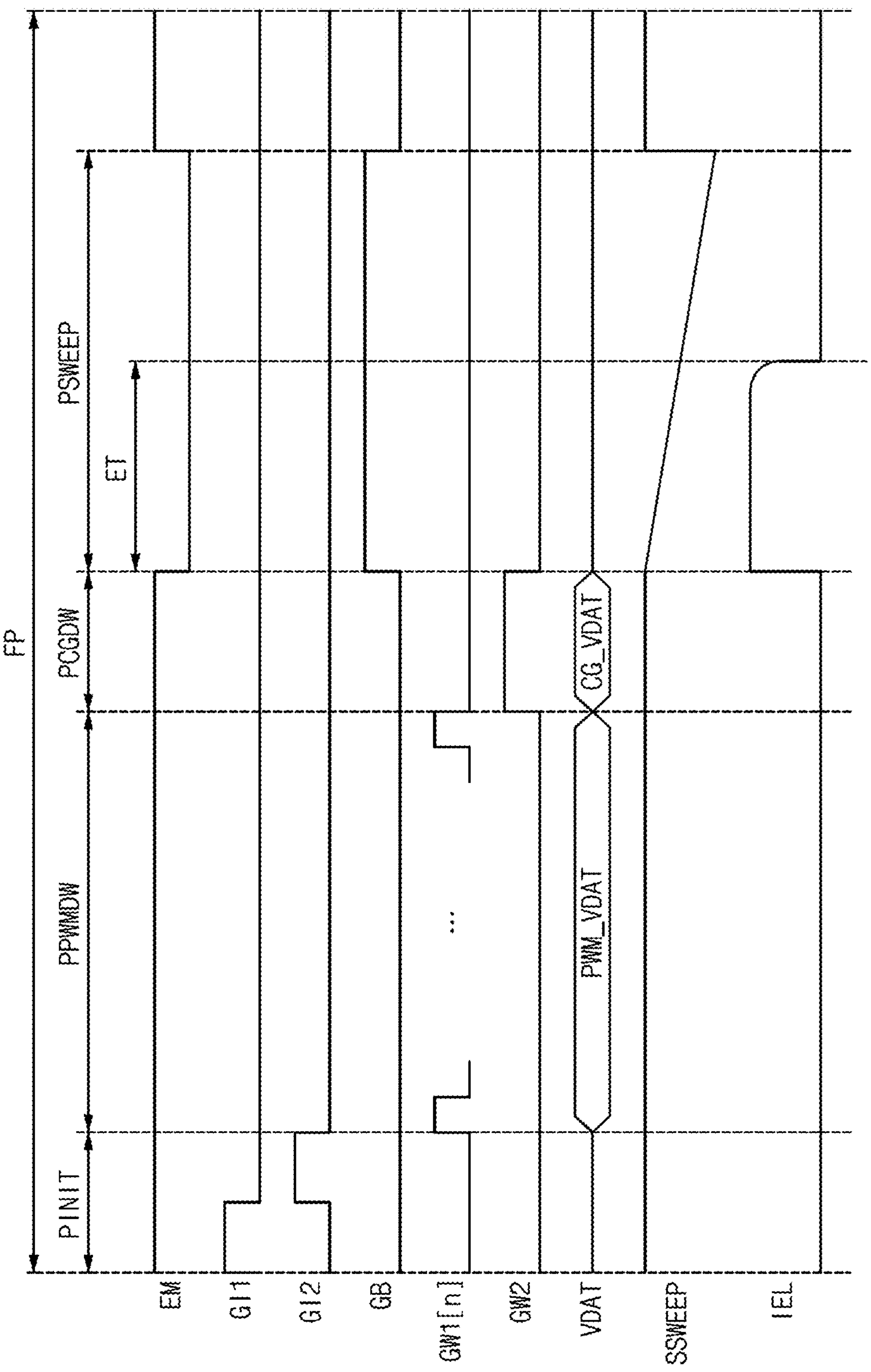
FIG. 8 is a schematic timing diagram for describing an operation of a pixel according to embodiments.
Figure 9:
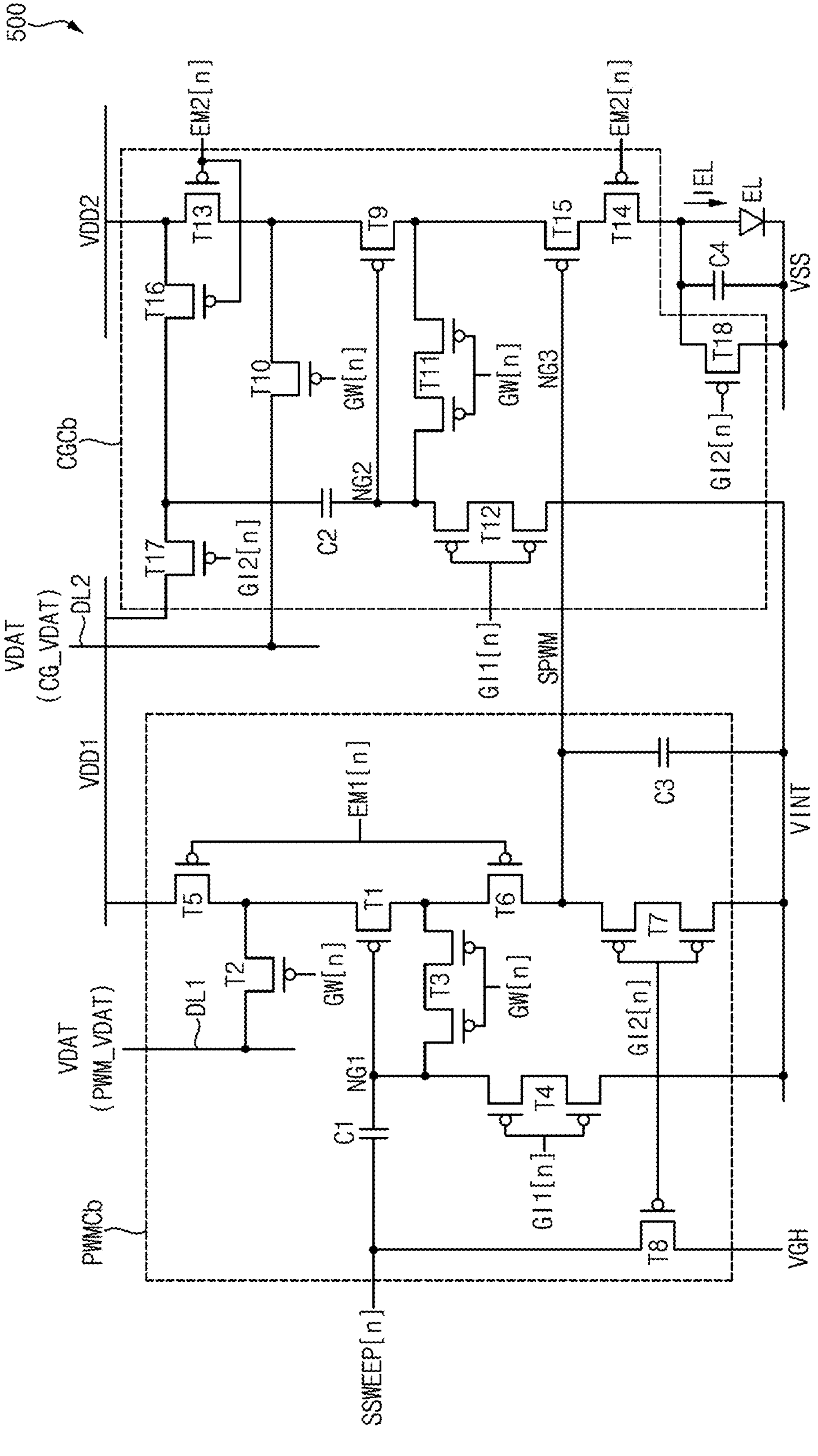
FIG. 9 is a schematic diagram of an equivalent circuit illustrating a pixel according to embodiments.
Figure 10:
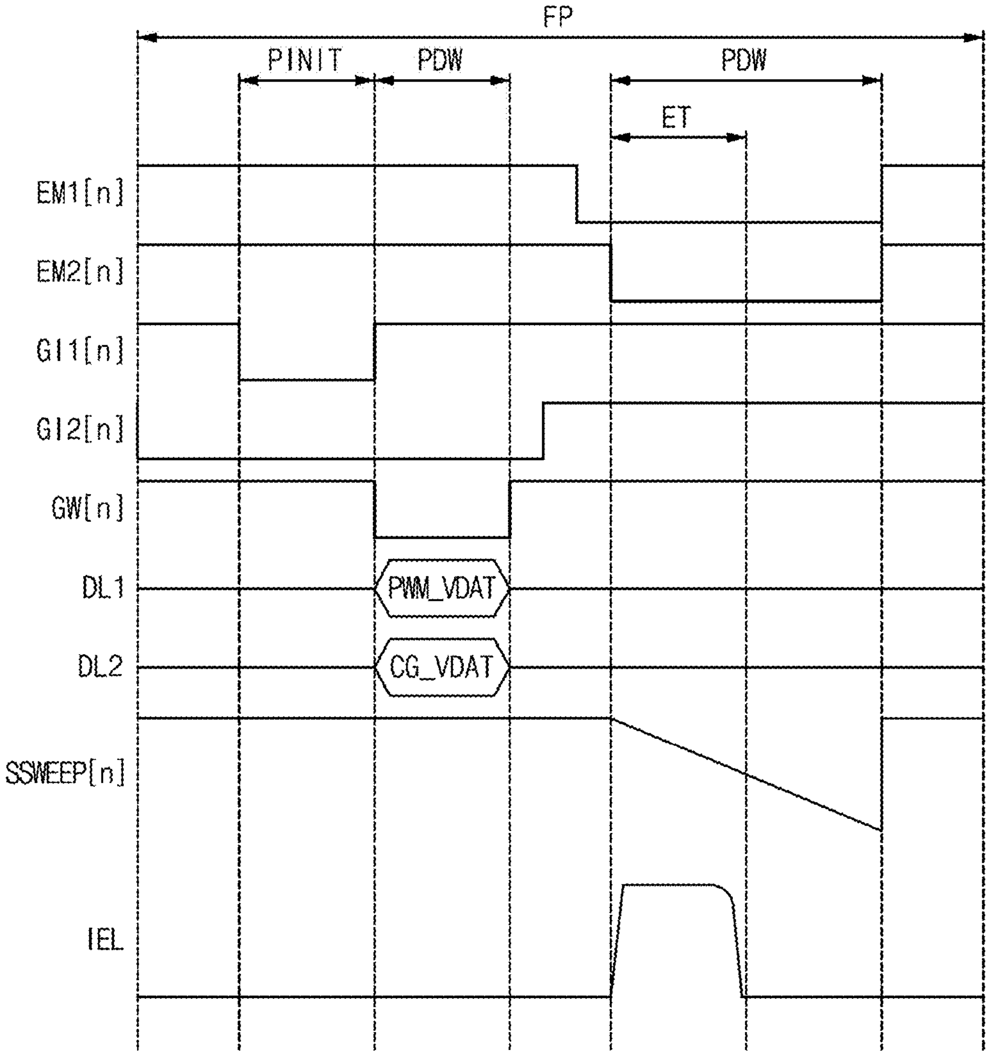
FIG. 10 is a schematic timing diagram for describing an operation of a pixel according to embodiments.

The scan driver 130 may provide the scan signals SS to multiple pixels PX based on a scan control signal SCTRL received from the controller 160. In other embodiments, the scan control signal SCTRL may include, but is not limited to, a scan start signal and a scan clock signal. In other embodiments, the scan signal SS provided to each pixel PX may include, but is not limited to, a first initialization signal GI1, a second initialization signal GI2, a first write signal GW1[*n*], a second write signal GW2 and a bypass signal GB as illustrated in FIGS. 7 and 8. For example, the first initialization signal GI1, the second initialization signal GI2, the second write signal GW2 and the bypass signal GB may be global signals that are substantially simultaneously applied to all the pixels PX of the display panel 110, and the first write signal GW1[*n*] may be a sequential signal that is sequentially applied to multiple pixels PX on a row-by-row basis. In other embodiments, the scan signal SS provided to each pixel PX may include, but is not limited to, a first initialization signal GI1[*n*], a second initialization signal GI2[*n*] and a write signal GW[n] as illustrated in FIGS. 9 and 10. For example, the first initialization signal GI1[*n*], the second initialization signal GI2[*n*] and the write signal GW[n] may be global signals that are substantially simultaneously applied to all the pixels PX of the display panel 110. However, the scan signal SS provided to each pixel PX is not limited to the examples illustrated in FIGS. 7 through 10. In other embodiments, the scan driver 130 may be integrated or formed in the display panel 110. In other embodiments, the scan driver 130 may be implemented with one or more integrated circuits.

The emission driver 140 may provide the emission signals EM to multiple pixels PX based on an emission control signal EMCTRL received from the controller 160. In other embodiments, the emission control signal EMCTRL may include, but is not limited to, an emission start signal and an emission clock signal. In other embodiments, the emission signal EM provided to each pixel PX may be a global signal that is substantially simultaneously applied to all the pixels PX of the display panel 110. In other embodiments, the emission signal EM provided to each pixel PX may include, but is not limited to, a first emission signal EM1[*n*] and a second emission signal EM2[*n*] as illustrated in FIGS. 9 and 10. For example, the first emission signal EM1[*n*] and the second emission signal EM2[*n*] may be sequential signals that are sequentially applied to multiple pixels PX on a row-by-row basis. In other embodiments, the emission driver 140 may be integrated or formed in the display panel 110. In other embodiments, the emission driver 140 may be implemented with one or more integrated circuits.

The sweep driver 150 may provide the sweep signal SSWEEP to multiple pixels PX based on a sweep control signal SWEEP_CTRL received from the controller 160. The sweep control signal SWEEP_CTRL may include a sweep clock signal SWEEP_CLK. In other embodiments, the sweep control signal SWEEP_CTRL may further include a sweep start signal. In other embodiments, the sweep signal SSWEEP may be a global signal that is substantially simultaneously applied to all the pixels PX of the display panel 110. In other embodiments, as illustrated in FIGS. 9 and 10, the sweep signal SSWEEP[n] may be a sequential signal that is sequentially applied to multiple pixels PX on a row-by-row basis. The sweep signal SSWEEP may gradually change in a sweep period (e.g., the sweep period PSWEEP illustrated in FIGS. 8 and 10) in each frame period. In other embodiments, as illustrated in FIGS. 8 and 10, the sweep signal SSWEEP may gradually decrease in the sweep period PSWEEP. In other embodiments, the sweep signal SSWEEP may gradually increase in the sweep period PSWEEP.

In other embodiments, to generate the sweep signal SSWEEP that gradually changes in the sweep period PSWEEP, as illustrated in FIG. 3, the sweep driver 150 may include a control unit 152, a digital-to-analog converter unit (DAC) 154, a low pass filter unit LPF) 156, and an amplifier unit 158. The control unit 152 may generate a digital value DVAL based on the sweep clock signal SWEEP_CLK. For example, the control unit 152 may decrease the digital value DVAL (e.g., by 1) at each clock cycle of the sweep clock signal SWEEP_CLK in the sweep period PSWEEP. The DAC unit 154 may perform digital-to-analog conversion on the digital value DVAL to generate an intermediate sweep signal SSWEEP'. For example, the intermediate sweep signal SSWEEP' may decrease step-by-step in the sweep period PSWEEP. The LPF unit 156 may perform low-pass filtering on the intermediate sweep signal SSWEEP', and the amplifier unit 158 may output the sweep signal SSWEEP by amplifying the intermediate sweep signal SSWEEP' on which the low-pass filtering has been performed. The sweep period PSWEEP output from the amplifier unit 158 may gradually decrease in the sweep period PSWEEP. Although FIG. 3 illustrates an example of a configuration of the sweep driver 150, the configuration of the sweep driver 150 is not limited to the example of FIG. 3.

In other embodiments, the sweep driver 150 may be integrated or formed in the display panel 110. In other embodiments, the sweep driver 150 may be formed in a power management integrated circuit (PMIC). In still other embodiments, the sweep driver 150 may be included in the data driver 120, the scan driver 130, and/or the controller 160.

The controller 160 (e.g., a timing controller (T-CON)) may receive input image data IDAT and a control signal CTRL from an external host processor (e.g., a graphics processing unit (GPU), an application processor (AP) or a graphics card). The control signal CTRL may include a mode signal SMODE indicating one of multiple modes having different maximum luminances. In other embodiments, the control signal CTRL may further include, but is not limited to, a vertical synchronization signal, a horizontal synchronization signal, an input data enable signal, a master clock signal, etc. The controller 160 may generate the output image data ODAT, the data control signal DCTRL, the scan control signal SCTRL, the emission control signal EMCTRL and the sweep control signal SWEEP_CTRL based on the input image data IDAT and the control signal CTRL. The controller 160 may control the data driver 120 by providing the output image data ODAT and the data control signal DCTRL to the data driver 120, may control the scan driver 130 by providing the scan control signal SCTRL to the scan driver 130, may control the emission driver 140 by providing the emission control signal EMCTRL to the emission driver 140, and may control the sweep driver 150 by providing the sweep control signal SWEEP_CTRL to the sweep driver 150.

The display device 100 according to embodiments may operate in one of multiple modes having different maximum luminances based on the mode signal SMODE. The maximum luminance may mean a luminance of the display panel 110 driven based on the input image data IDAT representing the maximum gray level (e.g., a 255-gray level). For example, as illustrated in FIG. 4, the display device 100 may display an image with a first luminance curve 210 having a first maximum luminance ML1 in case that the mode signal SMODE indicates a first mode MODE1, may display an image with a second luminance curve 230 having a second maximum luminance ML2 in case that the mode signal SMODE indicates a second mode MODE2, and may display an image with a third luminance curve 250 having a third maximum luminance ML3 in case that the mode signal SMODE indicates a third mode MODE3. For example, the first mode MODE1 may be, but is not limited to, a high brightness mode (HBM) having the first maximum luminance ML1 of about 3,000 nit, the second mode MODE2 may be, but is not limited to, a normal mode having the second maximum luminance ML2 of about 600 nit that is lower than the first maximum luminance ML1, and the third mode MODE3 may be, but is not limited to, an always on display (AOD) mode having the third maximum luminance ML3 of about 50 nit that is lower than the second maximum luminance ML2. Although an example of three modes MODE1, MODE2 and MODE3 is illustrated in FIG. 4, multiple modes of the display device 100 according to embodiments is not limited to the example of FIG. 4, and the display device 100 according to embodiments may have any two or more modes. For example, the display device 100 according to embodiments may have seven modes having different maximum luminances.

A conventional display device uses the same sweep signal having the same slope in multiple modes having different maximum luminances. Thus, in a mode having low maximum luminance (e.g., a low luminance mode or an AOD mode), luminous efficiency of each pixel may be reduced, and luminances at adjacent gray levels may not be distinguished. However, the display device 100 according to embodiments may change a slope of the sweep signal SSWEEP in multiple modes. In the display device 100 according to embodiments, time lengths of the sweep periods PSWEEP in which the sweep signal SSWEEP gradually changes may be different in multiple modes. In other embodiments, the controller 160 may provide the sweep clock signal SWEEP_CLK having different clock periods (or clock cycle times) in multiple modes to the sweep driver 150 such that the sweep signal SSWEEP has different slopes in multiple modes.

For example, as illustrated in FIG. 5, in the first mode MODE1 (e.g., the HBM) having the first maximum luminance ML1, the sweep clock signal SWEEP_CLK may have a first clock period CC_M1 (or a first clock cycle time), and the sweep driver 150 may generate the sweep signal SSWEEP that gradually changes from a first voltage level VL1 to a second voltage level VL2 during the sweep period PSWEEP_M1 having a first time length based on the sweep clock signal SWEEP_CLK having the first clock period CC_M1. For example, the first voltage level VL1 may be, but is not limited to, about 6 V, and the second voltage level VL2 may be, but is not limited to, about 0 V. In the second mode MODE2 (e.g., the normal mode) having the second maximum luminance ML2 lower than the first maximum luminance ML1, the sweep clock signal SWEEP_CLK may have a second clock period CC_M2 shorter than the first clock period CC_M1 (or a second clock cycle time shorter than the first clock cycle time), and the sweep driver 150 may generate the sweep signal SSWEEP that gradually changes from the first voltage level VL1 to the second voltage level VL2 during the sweep period PSWEEP_M2 having a second time length shorter than the first time length based on the sweep clock signal SWEEP_CLK having the second clock period CC_M2. Accordingly, the sweep signal SSWEEP may have a first slope in the first mode MODE1, and a second slope having an absolute value greater than an absolute value of the first slope in the second mode MODE2. In the third mode MODE3 (e.g., the AOD mode) having the third maximum luminance ML3 lower than the second maximum luminance ML2, the sweep clock signal SWEEP_CLK may have a third clock period CC_M3 shorter than the second clock period CC_M2 and the first clock period CC_M1 (or a third clock cycle time shorter than the second clock cycle time and the first clock cycle time), and the sweep driver 150 may generate the sweep signal SSWEEP that gradually changes from the first voltage level VL1 to the second voltage level VL2 during the sweep period PSWEEP_M3 having a third time length shorter than the second time length based on the sweep clock signal SWEEP_CLK having the third clock period CC_M3. Accordingly, in the third mode MODE3, the sweep signal SSWEEP may have a third slope having an absolute value greater than the absolute value of the second slope in the second mode MODE2. Although FIG. 5 illustrates an example in which the second voltage level VL2 is lower than the first voltage level VL1, and the sweep signal SSWEEP gradually decreases during the sweep period PSWEEP_M1, PSWEEP_M2 and PSWEEP_M3, in other embodiments, the second voltage level VL2 may be higher than the first voltage level VL1, and the sweep signal SSWEEP may gradually increase during the sweep period PSWEEP_M1, PSWEEP_M2 and PSWEEP_M3.

As described above, in the display device 100 according to embodiments, in case that a mode of the display device 100 is changed to a mode having a low maximum luminance, the absolute value of the slope of the sweep signal SSWEEP may increase. Thus, in a mode having a relatively low maximum luminance (e.g., the low luminance mode or the AOD mode), the absolute value of the slope of the sweep signal SSWEEP may be increased compared with an absolute value of a slope of a sweep signal in the conventional display device. If the absolute value of the slope of the sweep signal SSWEEP is increased, a falling time of the current IEL (e.g., IEL1 and IEL2) provided to the light emitting element EL may be decreased. For example, as illustrated in FIG. 6, in the conventional display device using the same sweep signal in multiple modes, in the low luminance mode or the AOD mode, the current IEL1 of the light emitting element may have a relatively long first falling time FT1. For example, a time period during which the current IEL1 of the light emitting element EL is a maximum efficiency current IME at which the light emitting element has a maximum luminous efficiency may be relatively short. Since the current IEL1 of the light emitting element is not constant or uniform, a color shift phenomenon may occur in the conventional display device. However, in the display device 100 according to embodiments, in the low brightness mode or the AOD mode, the absolute value of the slope of the sweep signal SSWEEP may be increased, and the current IEL1 of the light emitting element may be rapidly decreased based on the sweep signal SSWEEP having the increased slope. A second falling time FT2 of the current IEL2 of the light emitting element EL in the display device 100 according to embodiments may be decreased (e.g., shorter than) compared with the first falling time FT1 in the conventional display device. For example, in a case where the absolute value of the slope of the sweep signal SSWEEP is increased by two times, the current IEL2 of the light emitting element EL may have the second falling time FT2 of about 27.6 μs, which is decreased from the first falling time FT1 of about 140 μs. Accordingly, a time period during which the current IEL2 of the light emitting element EL is the maximum efficiency current IME may be increased, and the luminous efficiency of the light emitting element EL may be improved. Since the current IEL2 of the light emitting element EL may be substantially constant or uniform, the color shift phenomenon may be prevented in the display device 100, and the image quality of the display device 100 may be improved.

As described above, in the display device 100 according to embodiments, the slope of the sweep signal SSWEEP may be changed in multiple modes having different maximum luminances. Accordingly, the luminous efficiency of each pixel PX may be improved, and the image quality of the display device 100 may be improved.

FIG. 7 is a schematic diagram of an equivalent circuit illustrating a pixel according to embodiments.

Referring to FIG. 7, a pixel 400 according to embodiments may include a pulse width modulation circuit PWMCa that generates a pulse width modulation signal SPWM based on a pulse width modulation data voltage PWM_VDAT and a sweep signal SSWEEP, a current generation circuit CGCa that generates a current IEL based on a current generation data voltage CG_VDAT and the pulse width modulation signal SPWM, and a light emitting element EL that emits light based on the current IEL. In other embodiments, the pulse width modulation circuit PWMCa may include a first transistor P1, a second transistor N2, a third transistor N3, a fourth transistor P4, a fifth transistor P5, a sixth transistor N6, and a first capacitor C1. The current generation circuit CGCa may include a seventh transistor P7, an eighth transistor N8, a ninth transistor N9, a tenth transistor P10, an eleventh transistor P11, a twelfth transistor N12, a thirteenth transistor P13, and a second capacitor C2.

The first transistor P1 may generate the pulse width modulation signal SPWM based on a voltage of a first gate node NG1. In other embodiments, the first transistor P1 may include a gate electrically connected to the first gate node NG1, a first terminal electrically connected to the second and fourth transistors N2 and P4, and a second terminal electrically connected to the third and fifth transistors N3 and P5.

The second transistor N2 may transfer the pulse width modulation data voltage PWM_VDAT to the first terminal of the first transistor P1 in response to a first write signal GW1[*n*]. In other embodiments, the second transistor N2 may include a gate which receives the first write signal GW1[*n*], a first terminal electrically connected to a data line, and a second terminal electrically connected to the first terminal of the first transistor P1.

The third transistor N3 may diode-connect the first transistor P1 in response to the first write signal GW1[*n*]. In other embodiments, the third transistor N3 may include a gate which receives the first write signal GW1[*n*], a first terminal electrically connected to the second terminal of the first transistor P1, and a second terminal electrically connected to the first gate node NG1.

The fourth transistor P4 may connect a line which transfers a first high power supply voltage VDD1 to the first transistor P1 in response to an emission signal EM. In other embodiments, the fourth transistor P4 may include a gate which receives the emission signal EM, a first terminal electrically connected to the line which transfers the first high power supply voltage VDD1, and a second terminal electrically connected to the first terminal of the first transistor P1.

The fifth transistor P5 may connect the first transistor P1 to a second gate node NG2 in response to the emission signal EM. In other embodiments, the fifth transistor P5 may include a gate which receives the emission signal EM, a first terminal electrically connected to the second terminal of the first transistor P1, and a second terminal electrically connected to the second gate node NG2.

The sixth transistor N6 may transfer an initialization voltage VINT to the first gate node NG1 in response to a first initialization signal GI1. In other embodiments, the sixth transistor N6 may include a gate which receives the first initialization signal GI1, a first terminal electrically connected to the first gate node NG1, and a second terminal electrically connected to a line which transfers the initialization voltage VINT.

The first capacitor C1 may transfer the sweep signal SSWEEP to the first gate node NG1 in a coupling manner. The first capacitor C1 may include a first electrode which receives the sweep signal SSWEEP, and a second electrode electrically connected to the first gate node NG1.

The seventh transistor P7 may generate the current IEL based on a voltage of the second gate node NG2. In other embodiments, the seventh transistor P7 may include a gate electrically connected to the second gate node NG2, a first terminal electrically connected to the eighth and tenth transistors N8 and P10, and a second terminal electrically connected to the ninth and eleventh transistors N9 and P11.

The eighth transistor N8 can transfer the current generation data voltage CG_VDAT to the first terminal of the seventh transistor P7 in response to a second write signal GW2. In other embodiments, the eighth transistor N8 may include a gate which receives the second write signal GW2, a first terminal electrically connected to the data line, and a second terminal electrically connected to the first terminal of the seventh transistor P7.

The ninth transistor N9 may diode-connect the seventh transistor P7 in response to the second write signal GW2. In other embodiments, the ninth transistor N9 may include a gate which receives the second write signal GW2, a first terminal electrically connected to the second terminal of the seventh transistor P7, and a second terminal electrically connected to the second gate node NG2.

The tenth transistor P10 may connect a line which transfers a second high power supply voltage VDD2 to the seventh transistor P7 in response to the emission signal EM. In other embodiments, the tenth transistor P10 may include a gate which receives the emission signal EM, a first terminal electrically connected to the line which transfers the second high power supply voltage VDD2, and a second terminal electrically connected to the first terminal of the seventh transistor P7.

The eleventh transistor P11 may connect the seventh transistor P7 to the light emitting element EL in response to the emission signal EM. In other embodiments, the eleventh transistor P11 may include a gate which receives the emission signal EM, a first terminal electrically connected to the second terminal of the seventh transistor P7, and a second terminal electrically connected to the light emitting element EL.

The twelfth transistor N12 may transfer the initialization voltage VINT to the second gate node NG2 in response to a second initialization signal GI2. In other embodiments, the twelfth transistor N12 may include a gate which receives the second initialization signal GI2, a first terminal electrically connected to the second gate node NG2, and a second terminal electrically connected to the line which transfers the initialization voltage VINT.

The thirteenth transistor P13 may transfer an anode initialization voltage VAINT to the light emitting element EL in response to a bypass signal GB. In other embodiments, the thirteenth transistor P13 may include a gate which receives the bypass signal GB, a first terminal electrically connected to an anode of the light emitting element EL, and a second terminal electrically connected to a line which transfers the anode initialization voltage VAINT.

The second capacitor C2 may hold the voltage of the second gate node NG2. In other embodiments, the second capacitor C2 may include a first electrode electrically connected to the line which transfers the second high power supply voltage VDD2, and a second electrode electrically connected to the second gate node NG2.

The light emitting element EL may emit light based on the current IEL. In other embodiments, the light emitting element EL may include the anode electrically connected to the eleventh and thirteenth transistors P11 and P13, and a cathode electrically connected to a line which transfers a low power supply voltage VSS. In other embodiments, the light emitting element EL may be, but is not limited to, a micro light emitting diode (uLED). In other embodiments, the light emitting element EL may be an organic light emitting diode (OLED). In still other embodiments, the light emitting element EL may be a nano light emitting diode (NED), a quantum dot (QD) light emitting diode, an inorganic light emitting diode, or any other suitable light emitting element.

In other embodiments, as illustrated in FIG. 7, the first transistor P1, the fourth transistor P4, the fifth transistor P5, the seventh transistor P7, the tenth transistor P10, the eleventh transistor P11 and the thirteenth transistor P13 may be, but are not limited to, P-type metal oxide semiconductor (PMOS) transistors, and the second transistor N2, the third transistor N3, the sixth transistor N6, the eighth transistor N8, the ninth transistor N9 and the twelfth transistor N12 may be, but are not limited to, N-type metal oxide semiconductor (NMOS) transistors. In other embodiments, all of the first through thirteenth transistors P1 through P13 may be PMOS transistors, all of the first through thirteenth transistors P1 through P13 may be NMOS transistors, or a portion of the first through thirteenth transistors P1 through P13 may be PMOS transistors and the remaining portion of the first through thirteenth transistors P1 through P13 may be NMOS transistors.

In other embodiments, as illustrated in FIG. 7, each of the first transistor P1, the second transistor N2, the third transistor N3, the sixth transistor N6, the seventh transistor P7, the eighth transistor N8, the ninth transistor N9, and the twelfth transistor N12 may further include a bottom gate. For example, the bottom gate of the first transistor P1 may be electrically connected to the line which transfers the first high power supply voltage VDD1, the bottom gates of the second transistor N2 and the third transistor N3 may receive the first write signal GW1[*n*], the bottom gate of the sixth transistor N6 may receive the first initialization signal GI1, the bottom gate of the seventh transistor P7 may be electrically connected to the line which transfers the second high power supply voltage VDD2, the bottom gates of the eighth transistor N8 and the ninth transistor N9 may receive the second write signal GW2, and the bottom gate of the twelfth transistor N12 may receive the second initialization signal GI2, but is not limited thereto.

Hereinafter, an example of an operation of the pixel 400 is described below with reference to FIGS. 7 and 8.

FIG. 8 is a schematic timing diagram for describing an operation of a pixel according to embodiments.

Referring to FIGS. 7 and 8, a frame period FP for a display device including a pixel 400 may include an initialization period PINIT, a pulse width modulation data writing period PPWMDW, a current generation data writing period PCGDW and a sweep period PSWEEP.

In the initialization period PINIT, the first initialization signal GI1 and the second initialization signal GI2 may be applied. In other embodiments, as illustrated in FIG. 8, the first initialization signal GI1 and the second initialization signal GI2 may be sequentially applied. In other embodiments, the first initialization signal GI1 and the second initialization signal GI2 may be substantially simultaneously applied. In case that the first initialization signal GI1 is applied, the sixth transistor N6 may apply the initialization voltage VINT to the first gate node NG1. In case that the second initialization signal GI2 is applied, the twelfth transistor N12 may apply the initialization voltage VINT to the second gate node NG2. Thus, in the initialization period PINIT, the first gate node NG1 and the second gate node NG2 can be initialized based on the initialization voltage VINT. In other embodiments, the first and second initialization signals GI1 and GI2 may be global signals that are substantially simultaneously applied to all the pixels PX of the display device, and thus, in the initialization period PINIT, the first and second gate nodes NG1 and NG2 of all the pixels 400 may be substantially simultaneously initialized.

In the pulse width modulation data writing period PPWMDW, the first write signal GW1[*n*] may be sequentially applied to the pixels 400 of the display device on a row-by-row basis. The pulse width modulation data voltage PWM_VDAT may be applied as the data voltage VDAT to the data line. In case that the first write signal GW1[*n*] is applied, the second transistor N2 may transfer the pulse width modulation data voltage PWM_VDAT to the first terminal (e.g., a source) of the first transistor P1, and the third transistor N3 may diode-connect the first transistor P1. Thus, the pulse width modulation data voltage PWM_VDAT in which a threshold voltage of the first transistor P1 is compensated (e.g., the pulse width modulation data voltage PWM_VDAT decreased by an absolute value of the threshold voltage of the first transistor P1) may be applied to the first gate node NG1, and the first capacitor C1 may store the pulse width modulation data voltage PWM_VDAT in which the threshold voltage of the first transistor P1 is compensated.

In the current generation data writing period PCGDW, the second write signal GW2 may be substantially simultaneously applied to all the pixels 400 of the display device, and the current generation data voltage CG_VDAT may be applied as the data voltage VDAT to the data line. In case that the second write signal GW2 is applied, the eighth transistor N8 may transfer the current generation data voltage CG_VDAT to the first terminal (e.g., a source) of the seventh transistor P7, and the ninth transistor N9 may diode-connect the seventh transistor P7. Thus, the current generation data voltage CG_VDAT in which a threshold voltage of the seventh transistor P7 is compensated (e.g., the current generation data voltage CG_VDAT decreased by an absolute value of the threshold voltage of the seventh transistor P7) may be applied to the second gate node NG2, and the second capacitor C2 may store the current generation data voltage CG_VDAT in which the threshold voltage of the seventh transistor P7 is compensated.

Further, during the initialization period PINIT, the pulse width modulation data writing period PPWMDW and the current generation data writing period PCGDW, the bypass signal GB may have a low level, and the thirteenth transistor P13 may transfer the anode initialization voltage VAINT to the light emitting element EL in response to the bypass signal GB having the low level. Thus, during the initialization period PINIT, the pulse width modulation data writing period PPWMDW and the current generation data writing period PCGDW, the light emitting element EL may be initialized based on the anode initialization voltage VAINT.

In the sweep period PSWEEP, the emission signal EM may be changed from a high level to a low level, and the fourth, fifth, tenth and eleventh transistors P4, P5, P10 and P11 may be turned on in response to the emission signal EM having the low level. In case that the tenth and eleventh transistors P10 and P11 are turned on, the current IEL generated by the seventh transistor P7 may be provided to the light emitting element EL, and the light emitting element EL may emit light based on the current IEL generated by the seventh transistor P7. Further, in the sweep period PSWEEP, the sweep signal SSWEEP may gradually change (e.g., decrease). In case that the sweep signal SSWEEP applied to the first electrode of the first capacitor C1 decreases, the voltage of the first gate node NG1 electrically connected to the second electrode of the first capacitor C1 also may decrease. If the voltage of the first gate node NG1 decreases, the first transistor P1 may apply the first high power supply voltage VDD1 as the pulse width modulation signal SPWM to the second gate node NG2. In case that the first high power supply voltage VDD1 is applied as the pulse width modulation signal SPWM to the second gate node NG2, the seventh transistor P7 may be turned off not to provide the current IEL to the light emitting element EL, and the light emitting element EL may not emit light. The light emitting element EL may emit light during an emission time ET from a start time point of the sweep period PSWEEP to a time point at which the first transistor P1 is turned on. Further, since the time point at which the first transistor P1 is turned on is controlled according to a voltage level of the pulse width modulation data voltage PWM_VDAT, a time length of the emission time ET and a luminance of the pixel 400 corresponding to the time length of the emission time ET also may be controlled according to the voltage level of the pulse width modulation data voltage PWM_VDAT. For example, as the voltage level of the pulse width modulation data voltage PWM_VDAT increases, the time point at which the first transistor P1 is turned on may be delayed, the time length of the emission time ET may be increased, and the luminance of the pixel 400 may be increased.

FIG. 9 is a schematic diagram of an equivalent circuit illustrating a pixel according to embodiments.

Referring to FIG. 9, a pixel 500 according to embodiments may include a pulse width modulation circuit PWMCb that generates a pulse width modulation signal SPWM based on a pulse width modulation data voltage PWM_VDAT and a sweep signal SSWEEP[n], a current generation circuit CGCb that generates a current IEL based on a current generation data voltage CG_VDAT and the pulse width modulation signal SPWM, and a light emitting element EL that emits light based on the current IEL. In other embodiments, the pulse width modulation circuit PWMCb may include a first transistor T1, a second transistor T2, a third transistor T3, a fourth transistor T4, a fifth transistor T5, a sixth transistor T6, a seventh transistor T7, an eighth transistor T8, a first capacitor C1, and a third capacitor C3. The current generation circuit CGCb may include a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17, an eighteenth transistor T18 and a second capacitor C2. In other embodiments, the pixel 500 may further include a fourth capacitor C4 electrically connected in parallel with the light emitting element EL.

The first transistor T1 can generate the pulse width modulation signal SPWM based on a voltage of a first gate node NG1. In other embodiments, the first transistor T1 may include a gate electrically connected to the first gate node NG1, a first terminal electrically connected to the second and fifth transistors T2 and T5, and a second terminal electrically connected to the third and sixth transistors T3 and T6.

The second transistor T2 may transfer the pulse width modulation data voltage PWM_VDAT to the first terminal of the first transistor T1 in response to a write signal GW[n]. In other embodiments, the second transistor T2 may include a gate which receives the write signal GW[n], a first terminal electrically connected to a first data line DL1, and a second terminal electrically connected to the first terminal of the first transistor T1.

The third transistor T3 may diode-connect the first transistor T1 in response to the write signal GW[n]. In other embodiments, the third transistor T3 may include a gate which receives the write signal GW[n], a first terminal electrically connected to the second terminal of the first transistor T1, and a second terminal electrically connected to the first gate node NG1.

The fourth transistor T4 may transfer an initialization voltage VINT to the first gate node NG1 in response to a first initialization signal GI1[*n*]. In other embodiments, the fourth transistor T4 may include a gate which receives the first initialization signal GI1[*n*], a first terminal electrically connected to the first gate node NG1, and a second terminal electrically connected to a line which transfers the initialization voltage VINT.

The fifth transistor T5 may connect a line which transfers a first high power supply voltage VDD1 to the first transistor T1 in response to a first emission signal EM1[*n*]. In other embodiments, the fifth transistor T5 may include a gate which receives the first emission signal EM1[*n*], a first terminal electrically connected to the line which transfers the first high power supply voltage VDD1, and a second terminal electrically connected to the first terminal of the first transistor T1.

The sixth transistor T6 may connect the first transistor T1 to a third gate node NG3 in response to the first emission signal EM1[*n*]. In other embodiments, the sixth transistor T6 may include a gate which receives the first emission signal EM1[*n*], a first terminal electrically connected to the second terminal of the first transistor T1, and a second terminal electrically connected to the third gate node NG3.

The first capacitor C1 may transfer the sweep signal SSWEEP[n] to the first gate node NG1 in a coupling manner. The first capacitor C1 may include a first electrode which receives the sweep signal SSWEEP[n], and a second electrode electrically connected to the first gate node NG1.

The seventh transistor T7 may transfer the initialization voltage VINT to the third gate node NG3 in response to a second initialization signal GI2[*n*]. In other embodiments, the seventh transistor T7 may include a gate which receives the second initialization signal GI2[*n*], a first terminal electrically connected to the third gate node NG3, and a second terminal electrically connected to the line which transfers the initialization voltage VINT.

The eighth transistor T8 may transfer a high gate voltage VGH to the first electrode of the first capacitor C1 in response to the second initialization signal GI2[*n*]. In other embodiments, the eighth transistor T8 may include a gate which receives the second initialization signal GI2[*n*], a first terminal electrically connected to the first electrode of the first capacitor C1, and a second terminal electrically connected to a line which transfers the high gate voltage VGH.

The third capacitor C3 may hold a voltage of the third gate node NG3. In other embodiments, the third capacitor C3 may include a first electrode electrically connected to the third gate node NG3, and a second electrode electrically connected to the line which transfers the initialization voltage VINT.

The ninth transistor T9 may generate the current IEL based on a voltage of the second gate node NG2. In other embodiments, the ninth transistor T9 may include a gate electrically connected to the second gate node NG2, a first terminal electrically connected to the tenth and thirteenth transistors T10 and T13, and a second terminal electrically connected to the eleventh and fifteenth transistors T11 and T15.

The tenth transistor T10 may transfer the current generation data voltage CG_VDAT to the first terminal of the tenth transistor T10 in response to the write signal GW[n]. In other embodiments, the tenth transistor T10 may include a gate which receives the write signal GW[n], a first terminal electrically connected to a second data line DL2, and a second terminal electrically connected to the first terminal of the ninth transistor T9.

The eleventh transistor T11 may diode-connect the ninth transistor T9 in response to the write signal GW[n]. In other embodiments, the eleventh transistor T11 may include a gate which receives the write signal GW[n], a first terminal electrically connected to the second terminal of the ninth transistor T9, and a second terminal electrically connected to the second gate node NG2.

The twelfth transistor T12 may transfer the initialization voltage VINT to the second gate node NG2 in response to the first initialization signal GI1[*n*]. In other embodiments, the twelfth transistor T12 may include a gate which receives the first initialization signal GI1[*n*], a first terminal electrically connected to the second gate node NG2, and a second terminal electrically connected to the line which transfers the initialization voltage VINT.

The thirteenth transistor T13 may connect a line which transfers a second high power supply voltage VDD2 to the ninth transistor T9 in response to a second emission signal EM2[*n*]. In other embodiments, the thirteenth transistor T13 may include a gate which receives the second emission signal EM2[*n*], a first terminal electrically connected to the line which transfers the second high power supply voltage VDD2, and a second terminal electrically connected to the first terminal of the ninth transistor T9.

The fourteenth transistor T14 may connect the fifteenth transistor T15 to the light emitting element EL in response to the second emission signal EM2[*n*]. In other embodiments, the fourteenth transistor T14 may include a gate which receives the second emission signal EM2[n], a first terminal electrically connected to the fifteenth transistor T15, and a second terminal electrically connected to the light emitting element EL.

The fifteenth transistor T15 may be turned on or off in response to the pulse width modulation signal SPWM at the third gate node NG3. In other embodiments, the fifteenth transistor T15 may include a gate electrically connected to the third gate node NG3, a first terminal electrically connected to the ninth transistor T9, and a second terminal electrically connected to the fourteenth transistor T14.

The sixteenth transistor T16 may connect the line which transfers the second high power supply voltage VDD2 to the second capacitor C2 in response to the second emission signal EM2[n]. In other embodiments, the sixteenth transistor T16 may include a gate which receives the second emission signal EM2[n], a first terminal electrically connected to the line which transfers the second high power supply voltage VDD2, and a second terminal electrically connected to the second capacitor C2.

The seventeenth transistor T17 may connect the line which transfers the first high power supply voltage VDD1 to the second capacitor C2 in response to the second initialization signal GI2[n]. In other embodiments, the seventeenth transistor T17 may include a gate which receives the second initialization signal GI2[n], a first terminal electrically connected to the line which transfers the first high power supply voltage VDD1, and a second terminal electrically connected to the second capacitor C2.

The eighteenth transistor T18 may transfer a low power supply voltage VSS to the light emitting element EL in response to the second initialization signal GI2[n]. In other embodiments, the eighteenth transistor T18 may include a gate which receives the second initialization signal GI2[n], a first terminal electrically connected to an anode of the light emitting element EL, and a second terminal electrically connected to a line which transfers the low power supply voltage VSS.

The second capacitor C2 may hold a voltage of the second gate node NG2. In other embodiments, the second capacitor C2 may include a first electrode electrically connected to the sixteenth and seventeenth transistors T16 and T17, and a second electrode electrically connected to the second gate node NG2.

The fourth capacitor C4 may be electrically connected in parallel with the light emitting element EL. In other embodiments, the fourth capacitor C4 may include a first electrode electrically connected to the anode of the light emitting element EL, and a second electrode electrically connected to the line which transfers the low power supply voltage VSS.

The light emitting element EL may emit light based on the current IEL. In other embodiments, the light emitting element EL may include the anode electrically connected to the fourteenth and eighteenth transistors T14 and T18, and a cathode electrically connected to the line which transfers the low power supply voltage VSS. In other embodiments, the light emitting element LED may be a micro light emitting diode (μLED), but is not limited thereto. In other embodiments, the light emitting element LED may be an organic light emitting diode (OLED). In still other embodiments, the light emitting element LED may be a nano light emitting diode (NED), a quantum dot (QD) light emitting diode, an inorganic light emitting diode, or any other suitable light emitting element.

In other embodiments, as illustrated in FIG. 9, the first through eighteenth transistors T1 through T18 may be PMOS transistors, but are not limited thereto. In other embodiments, some or all of the first through eighteenth transistors T1 through T18 may be NMOS transistors.

In other embodiments, as illustrated in FIG. 9, each of the third transistor T3, the fourth transistor T4, the seventh transistor T7, the eleventh transistor T11 and the twelfth transistor T12 may be dual transistors including sub-transistors electrically connected in series, but are not limited thereto.

Hereinafter, an example of an operation of the pixel 500 is described below with reference to FIGS. 9 and 10.

FIG. 10 is a schematic timing diagram for describing an operation of a pixel according to embodiments.

Referring to FIGS. 9 and 10, a frame period FP for a display device including the pixel 500 may include an initialization period PINIT, a data writing period PDW and a sweep period PSWEEP.

In the initialization period PINIT, the first initialization signal GI1[n] may be applied. In case that the first initialization signal GI1[n] is applied, the fourth and twelfth transistors T4 and T12 may be turned on. The fourth transistor T4 may apply the initialization voltage VINT to the first gate node NG1, and the twelfth transistor T12 may apply the initialization voltage VINT to the second gate node NG2. Thus, in the initialization period PINIT, the first gate node NG1 and the second gate node NG2 may be initialized based on the initialization voltage VINT.

In the data writing period PDW, the write signal GW[n] may be applied. In case that the write signal GW[n] is applied, the second, third, tenth, and eleventh transistors T2, T3, T10, and T11 may be turned on. The second transistor T2 may transfer the pulse width modulation data voltage PWM_VDAT to the first terminal (e.g., a source) of the first transistor T1, and the third transistor T3 may diode-connect the first transistor T1. Thus, the pulse width modulation data voltage PWM_VDAT in which a threshold voltage of the first transistor T1 is compensated (e.g., the pulse width modulation data voltage PWM_VDAT decreased by an absolute value of the threshold voltage of the first transistor T1) may be applied to the first gate node NG1, and the first capacitor C1 may store the pulse width modulation data voltage PWM_VDAT in which the threshold voltage of the first transistor T1 is compensated. The tenth transistor T10 may transfer the current generation data voltage CG_VDAT to the first terminal (e.g., a source) of the ninth transistor T9, and the eleventh transistor T11 may diode-connect the ninth transistor T9. Thus, the current generation data voltage CG_VDAT in which a threshold voltage of the ninth transistor T9 is compensated (e.g., the current generation data voltage CG_VDAT decreased by an absolute value of the threshold voltage of the ninth transistor T9) may be applied to the second gate node NG2, and the second capacitor C2 may store the current generation data voltage CG_VDAT in which the threshold voltage of the ninth transistor T9 is compensated.

During a period including the initialization period PINIT and the data writing period PDW, the second initialization signal GI2[n] may be applied. In case that the second initialization signal GI2[n] is applied, the seventh, eighth, seventeenth and eighteenth transistors T7, T8, T17, and T18 may be turned on. The seventh transistor T7 may initialize the third gate node NG3 based on the initialization voltage VINT. The eighth transistor T8 may initialize the first electrode of the first capacitor C1 based on the high gate voltage VGH. The seventeenth transistor T17 may connect the line which transfers the first high power supply voltage VDD1 to the second capacitor C2. The eighteenth transistor T18 may initialize the light emitting element EL based on the low power supply voltage VSS.

In the sweep period PSWEEP, the first emission signal EM1[*n*] and the second emission signal EM2[*n*] may be applied. In case that the first emission signal EM1[*n*] is applied, the fifth and sixth transistors T5 and T6 may be turned on. In case that the second emission signal EM2[*n*] is applied, the thirteenth and fourteenth transistors T13 and T14 may be turned on. Before the first transistor T1 is turned on, the third gate node NG3 may have the initialization voltage VINT, and the fifteenth transistor T15 may be turned on based on the initialization voltage VINT at the third gate node NG3. In case that the thirteenth, fourteenth and fifteenth transistors T13, T14, and T15 are turned on, the current IEL generated by the ninth transistor T9 may be provided to the light emitting element EL, and the light emitting element EL may emit light based on the current IEL generated by the ninth transistor T9. In the sweep period PSWEEP, the sweep signal SSWEEP[n] may gradually change (e.g., decrease). In case that the sweep signal SSWEEP[n] applied to the first electrode of the first capacitor C1 decreases, the voltage of the first gate node NG1 electrically connected to the second electrode of the first capacitor C1 also may decrease. In case that the voltage of the first gate node NG1 decreases, the first transistor T1 may apply the first high power supply voltage VDD1 as the pulse width modulation signal SPWM to the third gate node NG3. In case that the first high power supply voltage VDD1 is applied as the pulse width modulation signal SPWM to the third gate node NG3, the fifteenth transistor T15 may be turned off not to provide the current IEL to the light emitting element EL, and the light emitting element EL may not emit light. The light emitting element EL may emit light during an emission time ET from a start time point of the sweep period PSWEEP to a time point at which the first transistor T1 is turned on. Further, since the time point at which the first transistor T1 is turned on is controlled according to a voltage level of the pulse width modulation data voltage PWM_VDAT, a time length of the emission time ET a luminance of the pixel 500 corresponding to the time length of the emission time ET also may be controlled according to the voltage level of the pulse width modulation data voltage PWM_VDAT. For example, as the voltage level of the pulse width modulation data voltage PWM_VDAT increases, the time point at which the first transistor P1 is turned on may be delayed, the time length of the emission time ET may be increased, and the luminance of the pixel 500 may be increased.

In other embodiments, the first emission signal EM1[*n*], the second emission signal EM2[*n*], the first initialization signal GI1[*n*], the second initialization signal GI2[*n*], the write signal GW[n] and the sweep signal SSWEEP[n] may be sequential signals that are sequentially applied to the pixels 500 of the display device on a row-by-row basis. In this case, the pixels 500 of the display device may sequentially emit light on the row-by-row basis.

Although FIGS. 7 and 9 illustrate examples of configurations of the pixels 400 and 500, and FIGS. 8 and 10 illustrate examples of operations of the pixels 400 and 500, the configuration and the operation of the pixels 400 and 500 of the display device according to embodiments are not limited to the examples of FIGS. 7 through 10.

Figure 11:
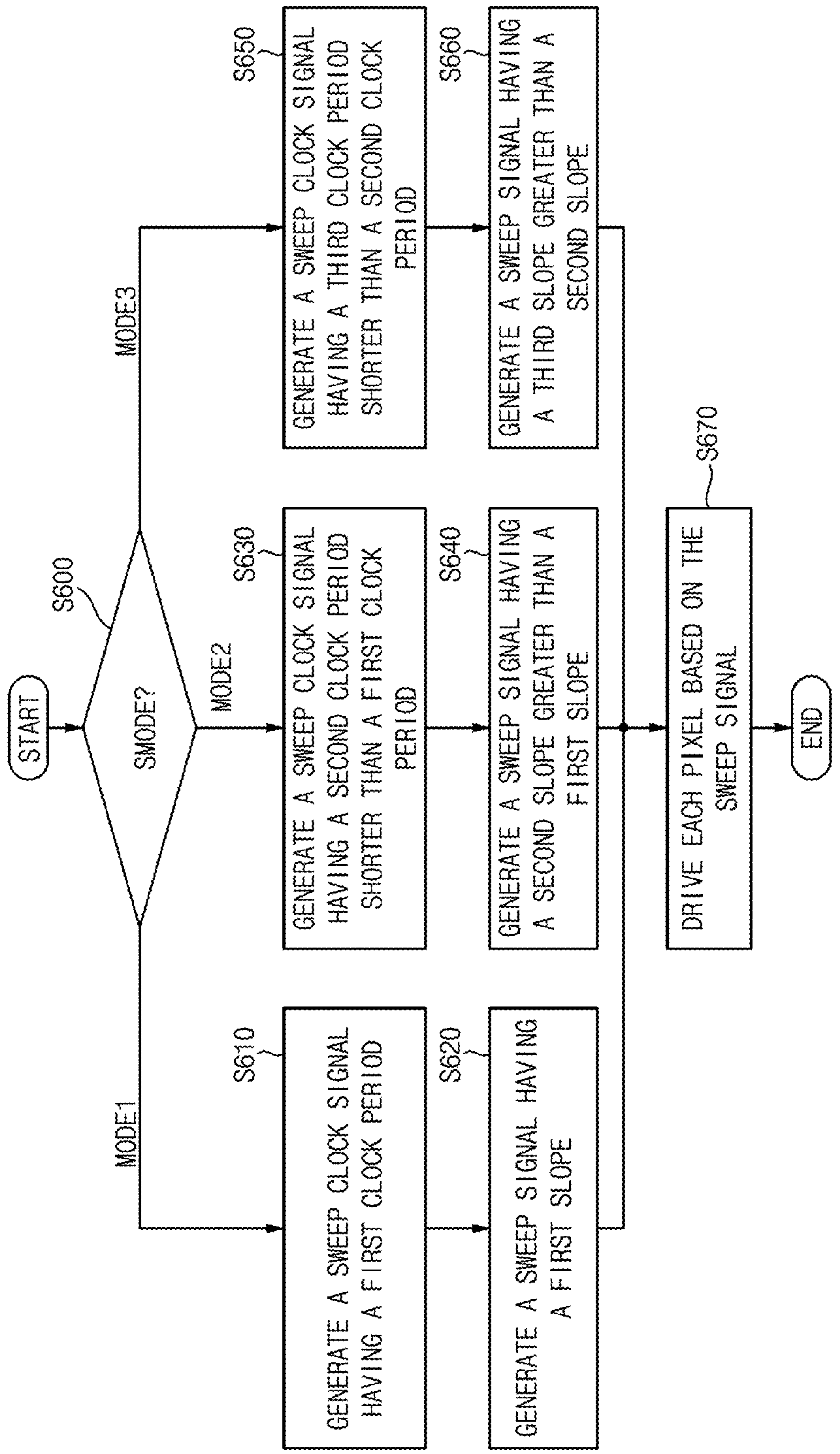
FIG. 11 is a schematic flowchart illustrating a method of operating a display device according to embodiments.

FIG. 11 is a schematic flowchart illustrating a method of operating a display device according to embodiments.

Referring to FIGS. 1 and 11, a controller 160 may receive a mode signal SMODE indicating one of multiple modes MODE1, MODE2 and MODE3 having different maximum luminances (S600). In case that the mode signal SMODE indicates a first mode MODE1 (e.g., an HBM) having a first maximum luminance (S600: MODE1), the controller 160 may generate a sweep clock signal SWEEP_CLK having a first clock period (or a first clock cycle time) (S610), and a sweep driver 150 may generate a sweep signal SSWEEP having a first slope based on the sweep clock signal SWEEP_CLK having the first clock period (S620). In the first mode MODE1, a display device 100 may drive each pixel PX based on the sweep signal SSWEEP having the first slope (S670).

In case that the mode signal SMODE indicates a second mode MODE2 (e.g., a normal mode) having a second maximum luminance lower than the first maximum luminance (S600: MODE2), the controller 160 may generate the sweep clock signal SWEEP_CLK having a second clock period shorter than the first clock period (or a second clock cycle time shorter than the first clock cycle time) (S630), and the sweep driver 150 may generate the sweep signal SSWEEP having a second slope having an absolute value greater than an absolute value of the first slope based on the sweep clock signal SWEEP_CLK having the second clock period (S640). In the second mode MODE2, the display device 100 may drive each pixel PX based on the sweep signal SSWEEP having the second slope (S670).

In case that the mode signal SMODE indicates a third mode MODE3 (e.g., an AOD mode) having a third maximum luminance lower than the second maximum luminance (S600: MODE3), the controller 160 may generate the sweep clock signal SWEEP_CLK having a third clock period shorter than the second clock period (or a third clock cycle time shorter than the second clock cycle time) (S650), and the sweep driver 150 may generate the sweep signal SSWEEP having a third slope having an absolute value greater than the absolute value of the second slope based on the sweep clock signal SWEEP_CLK having the third clock period (S660). In the third mode MODE3, the display device 100 may drive each pixel PX based on the sweep signal SSWEEP having the third slope (S670).

As described above, in a method of operating the display device 100 according to embodiments, a slope of the sweep signal SSWEEP may be changed in multiple modes MODE1, MODE2, and MODE3 having different maximum luminances. Accordingly, luminous efficiency of each pixel PX may be improved, and an image quality of the display device 100 may be improved.

Figure 12:
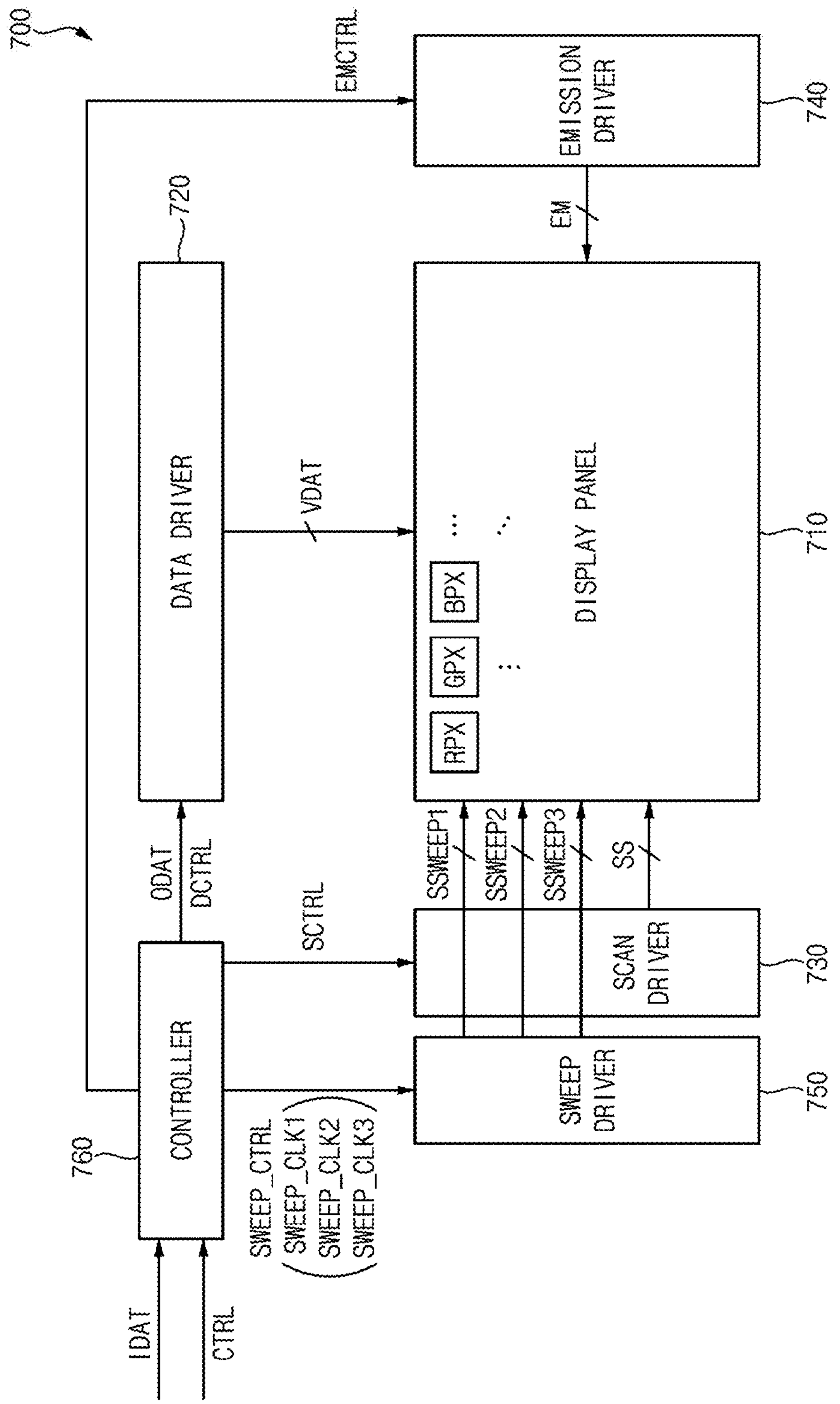
FIG. 12 is a schematic block diagram illustrating a display device according to embodiments.
Figure 13:
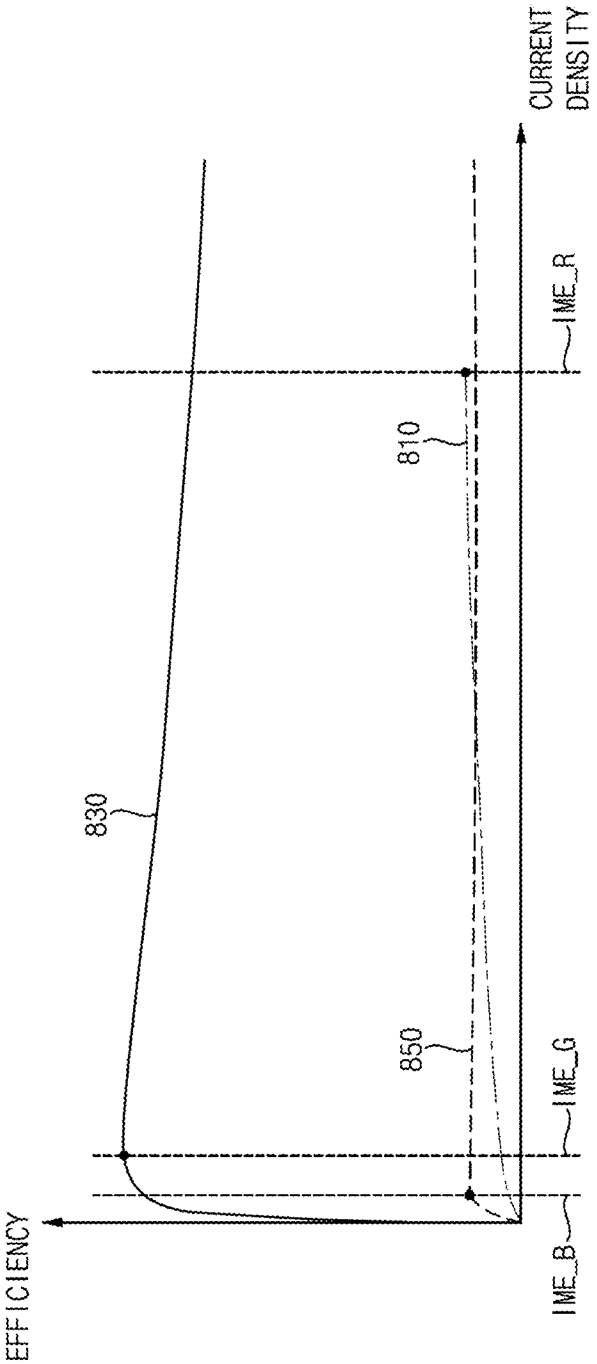
FIG. 13 is a schematic diagram for describing an example of luminous efficiency according to current densities of a red pixel, a green pixel and a blue pixel.
Figure 14:
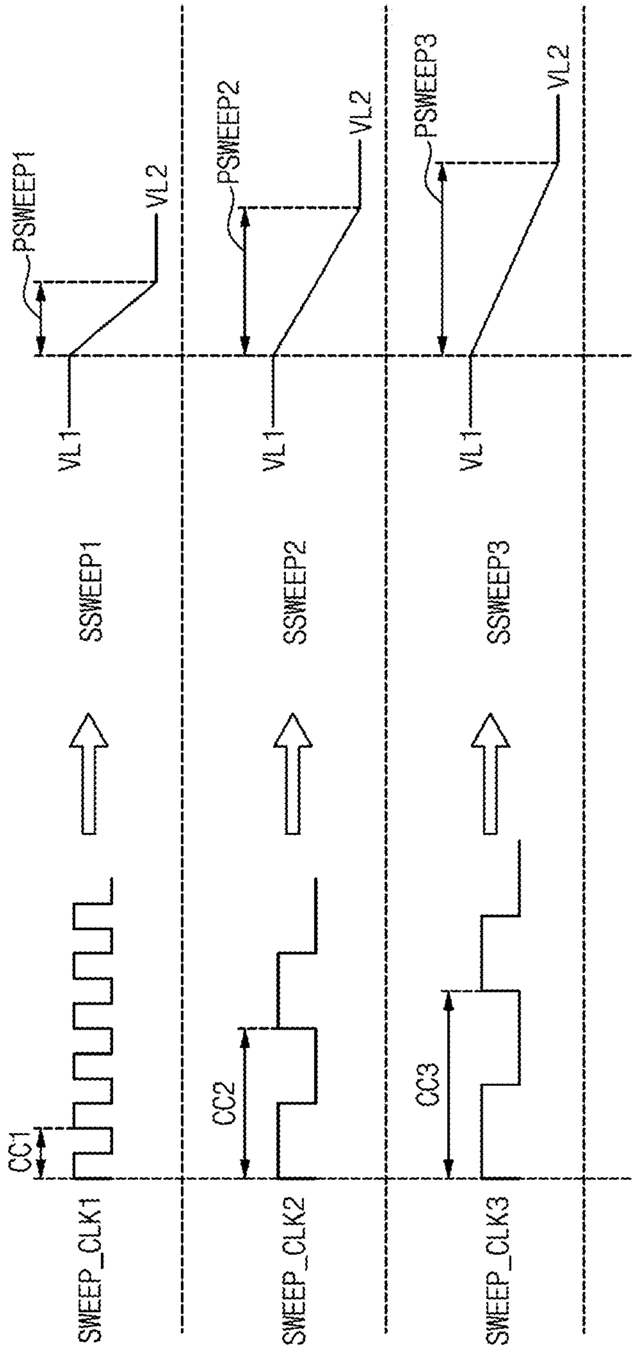
FIG. 14 is a schematic diagram illustrating an example of first, second and third sweep clock signals and first, second and third sweep signals.
Figure 15:
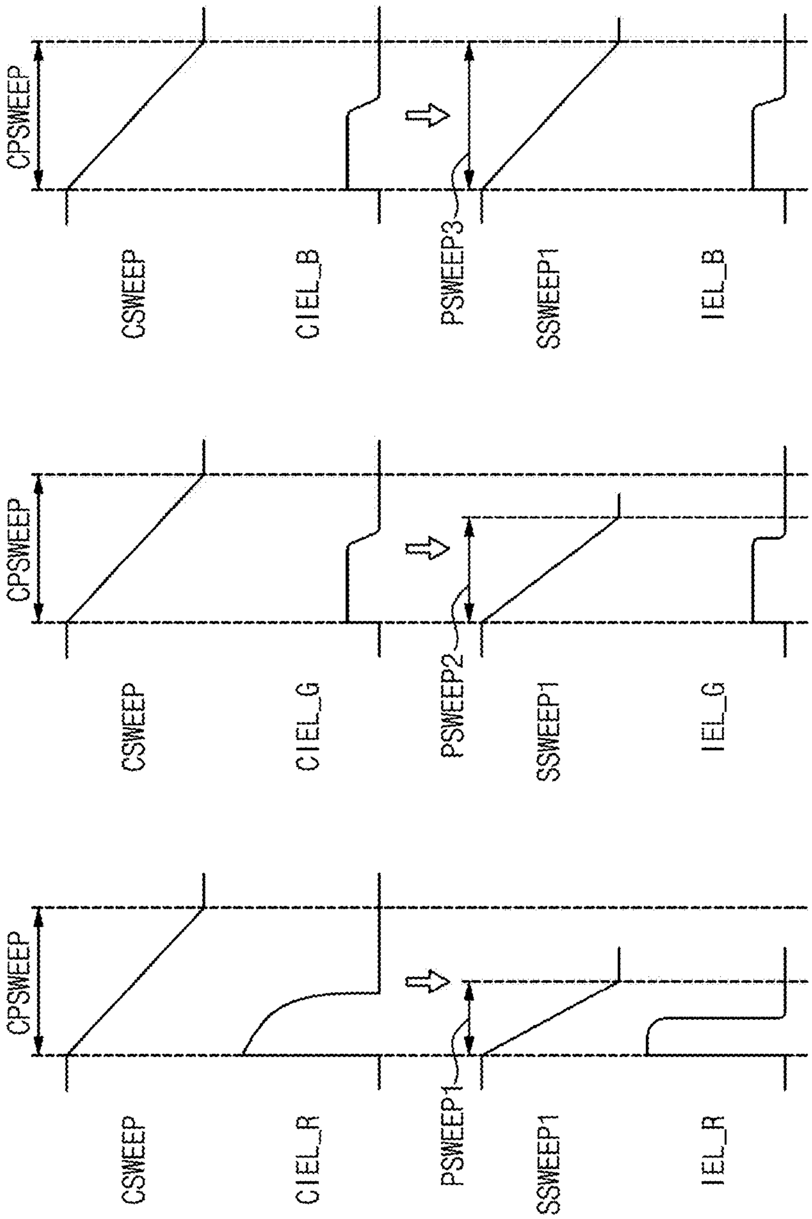
FIG. 15 is a schematic diagram for describing an example of currents of red, green and blue light emitting elements according to first, second and third sweep signals.

FIG. 12 is a schematic block diagram illustrating a display device according to embodiments, FIG. 13 is a schematic diagram for describing an example of luminous efficiency according to current densities of a red pixel, a green pixel, and a blue pixel, FIG. 14 is a schematic diagram illustrating an example of first, second, and third sweep clock signals and first, second, and third sweep signals, and FIG. 15 is a schematic diagram for describing an example of currents of red, green, and blue light emitting elements according to first, second, and third sweep signals.

Referring to FIG. 12, a display device 700 according to embodiments may include a display panel 710, a data driver 720, a scan driver 730, an emission driver 740, a sweep driver 750, and a controller 760. The display device 700 of FIG. 12 may have a similar configuration and a similar operation to a display device 100 of FIG. 1, except that the sweep driver 750 may provide different sweep signals SSWEEP1, SSWEEP2, and SSWEEP3 to a red pixel RPX, a green pixel GPX, and a blue pixel BPX.

The display panel 710 may include the red pixel RPX that emits red light, the green pixel GPX that emits green light, and the blue pixel BPX that emits blue light. Meanwhile, current densities for the red, green, and blue pixels RPX, GPX and BPX at which the red, green and blue pixels RPX, GPX and BPX emit light with the maximum luminous efficiency may be different from each other. In FIG. 13, 810 represents the luminous efficiency of the red pixel RPX according to the current density, 830 represents the luminous efficiency of the green pixel GPX according to the current density, and 850 represents the luminous efficiency of the blue pixel BPX according to the current density. As illustrated in FIG. 13, the current density IME_R at which the red pixel RPX has the maximum luminous efficiency may be higher than the current densities IME_G and IME_B at which the green and blue pixels GPX and BPX have the maximum luminous efficiency. Accordingly, compared with the green and blue pixels GPX and BPX, it may be desirable to provide a relatively high current to a light emitting element of the red pixel RPX for a relatively short emission time. The current density IME_B at which the blue pixel BPX has the maximum luminous efficiency may be lower than the current densities IME_R and IME_G at which the red and green pixels RPX and GPX have the maximum luminous efficiency. Accordingly, compared with the red and green pixels RPX and GPX, it may be desirable to provide a relatively low current to a light emitting element of the blue pixel BPX for a relatively long emission time.

In a conventional display device, a time length of a sweep period in which a sweep signal gradually changes is determined based on the relatively long emission time of the blue pixel BPX, and the same sweep signal is provided to the red pixel RPX, the green pixel GPX, and the blue pixel BPX. However, in the display device 700 according to embodiments, the sweep driver 750 may provide a first sweep signal SSWEEP1 to the red pixel RPX, may provide a second sweep signal SSWEEP2 to the green pixel GPX, and may provide a third sweep signal SSWEEP3 to the blue pixel BPX. The first sweep signal SSWEEP1, the second sweep signal SSWEEP2, and the third sweep signal SSWEEP3 may have different slopes.

To perform these operations, the controller 760 may provide a first sweep clock signal SWEEP_CLK1, a second sweep clock signal SWEEP_CLK2, and a third sweep clock signal SWEEP_CLK3 having different clock periods to the sweep driver 750. For example, as illustrated in FIG. 14, a second clock period CC2 of the second sweep clock signal SWEEP_CLK2 may be shorter than a third clock period CC3 of the third sweep clock signal SWEEP_CLK3, and a first clock period CC1 of the first sweep clock signal SWEEP_CLK1 may be shorter than the second clock period CC2 of the second sweep clock signal SWEEP_CLK2.

The sweep driver 750 may generate the first sweep signal SSWEEP1 for the red pixel RPX based on the first sweep clock signal SWEEP_CLK1 having the first clock period CC1, may generate the second sweep signal SSWEEP2 for the green pixel GPX based on the second sweep clock signal SWEEP_CLK2 having the second clock period CC2, and may generate the third sweep signal SSWEEP3 for the blue pixel BPX based on the third sweep clock signal SWEEP_CLK3 having the third clock period CC3. Thus, as illustrated in FIG. 14, an absolute value of a second slope of the second sweep signal SSWEEP2 may be greater than an absolute value of a third slope of the third sweep signal SSWEEP3, and an absolute value of a first slope of the first sweep signal SSWEEP1 may be greater than the absolute value of the second slope of the second sweep signal SSWEEP2. Further, a first sweep period PSWEEP1 in which the first sweep signal SSWEEP1 gradually changes, a second sweep period PSWEEP2 in which the second sweep signal SSWEEP2 gradually changes, and a third sweep period PSWEEP3 in which the third sweep signal SSWEEP3 gradually changes may have different time lengths. For example, as illustrated in FIG. 14, a second time length of the second sweep period PSWEEP2 may be shorter than a third time length of the third sweep period PSWEEP3, and a first time length of the first sweep period PSWEEP1 may be shorter than the second time length of the second sweep period PSWEEP2. The third sweep signal SSWEEP3 may gradually change from a first voltage level VL1 to a second voltage level VL2 during the third sweep period PSWEEP3 having the third time length, the second sweep period PSWEEP2 may gradually change from the first voltage level VL1 to the second voltage level VL2 during the second sweep period PSWEEP2 having the second time length shorter than the third time length of the third sweep period PSWEEP3. The first sweep signal SSWEEP1 may gradually change from the first voltage level VL1 to the second voltage level VL2 during the first sweep period PSWEEP1 having the first time length shorter than the second time length of the second sweep period PSWEEP2.

As illustrated in FIG. 15, in a conventional display device, the same sweep signal CSWEEP that is gradually changes during the same sweep period CPSWEEP having the same time length is applied to all of red, green and blue pixels. In the conventional display device, currents CIEL_R, CIEL_G, and CIEL_B of the red, green, and blue pixels may have relatively long falling times. However, in the display device 700 according to embodiments, even if the third sweep signal SSWEEP3 is similar to the sweep signal CSWEEP of the conventional display device and a current IEL_B of the blue pixel BPX is similar to the current CIEL_B of the blue pixel of the conventional display device, the second sweep signal SSWEEP2 applied to the green pixel GPX may change during the second sweep period PSWEEP2 having the second time length shorter than the third time length of the third sweep period PSWEEP3. Thus, the second sweep signal SSWEEP2 may have the second slope having the absolute value greater than that of the third sweep signal SSWEEP3 or the sweep signal CSWEEP of the conventional display device, and a falling time of a current IEL_G of the green pixel GPX may be reduced. Further, since the first sweep signal SSWEEP1 applied to the red pixel RPX changes during the first sweep period PSWEEP1 having the first time length shorter than the second time length of the second sweep period PSWEEP2. Thus, the first sweep signal SSWEEP1 may have the first slope having the absolute value greater than that of the third sweep signal SSWEEP3 or the conventional sweep signal CSWEEP of the conventional display device, and a falling time of a current IEL_R of the red pixel RPX may be further reduced. Accordingly, luminous efficiency of each pixel (in particular, the red pixel RPX) may be improved, and an image quality of the display device 700 may be improved.

Figure 16:
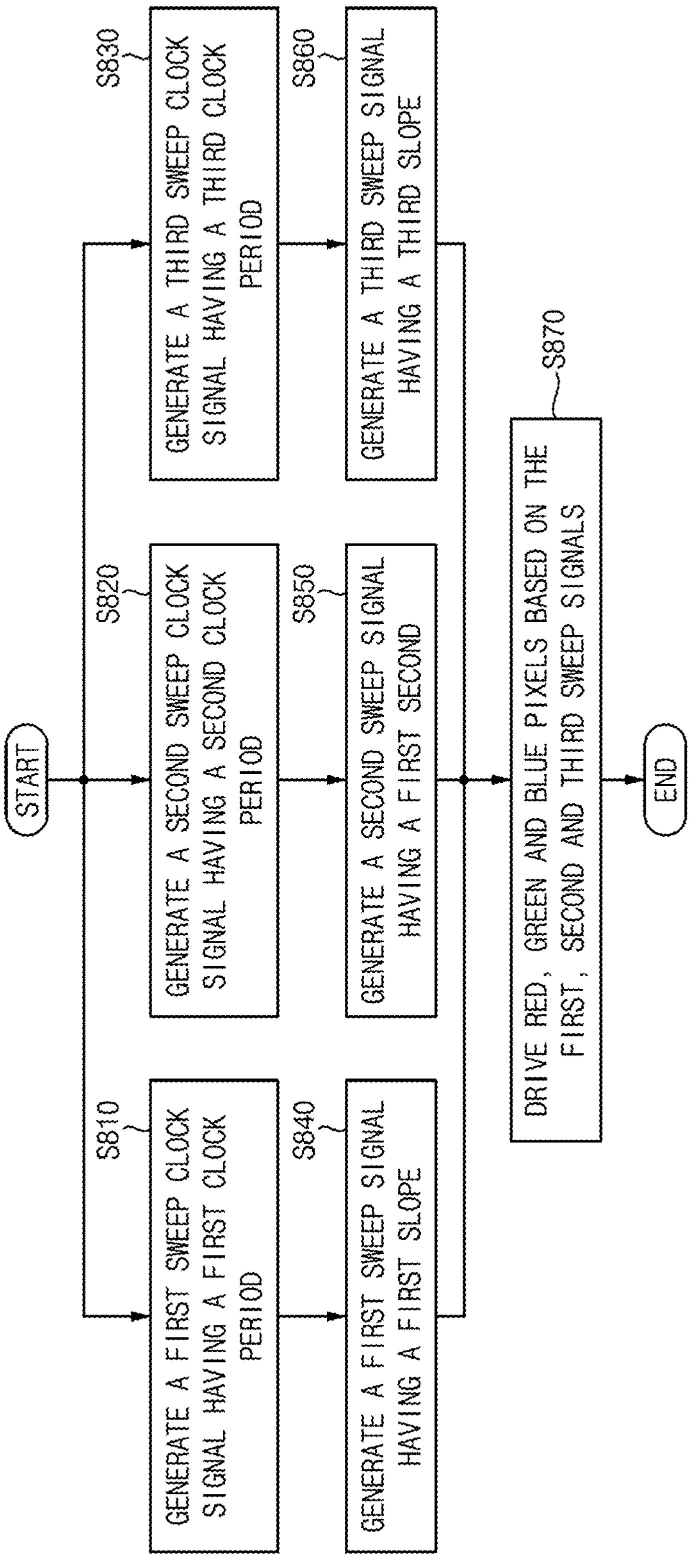
FIG. 16 is a schematic flowchart illustrating a method of operating a display device according to embodiments.

FIG. 16 is a schematic flowchart illustrating a method of operating a display device according to embodiments.

Referring to FIGS. 12 and 16, the controller 760 may generate the third sweep clock signal SWEEP_CLK3 having the third clock period (S830), may generate the second sweep clock signal SWEEP_CLK2 having the second clock period shorter than the third clock period (S820), and may generate the first sweep clock signal SWEEP_CLK1 having the first clock period shorter than the second clock period (S810).

The sweep driver 750 may generate the third sweep signal SSWEEP3 having the third slope based on the third sweep clock signal SWEEP_CLK3 having the third clock period (S860), may generate the second sweep signal SSWEEP2 having the second slope having the absolute value greater than the absolute value of the third slope based on the second sweep clock signal SWEEP_CLK2 having the second period (S850), and may generate the first sweep signal SSWEEP1 having the first slope having the absolute value greater than the absolute value of the second slope based on the first sweep clock signal SWEEP_CLK1 having the first clock period (S840).

Thus, the display device 700 may drive the red pixel RPX based on the first sweep signal SSWEEP1 having the first slope, drive the green pixel GPX based on the second sweep signal SSWEEP2 having the second slope, and drive the blue pixel BPX based on the third sweep signal SSWEEP3 having the third slope (S870). Accordingly, the luminous efficiency of each pixel (particularly, the red pixel RPX) may be improved, and the image quality of the display device 700 may be improved.

Figure 17:
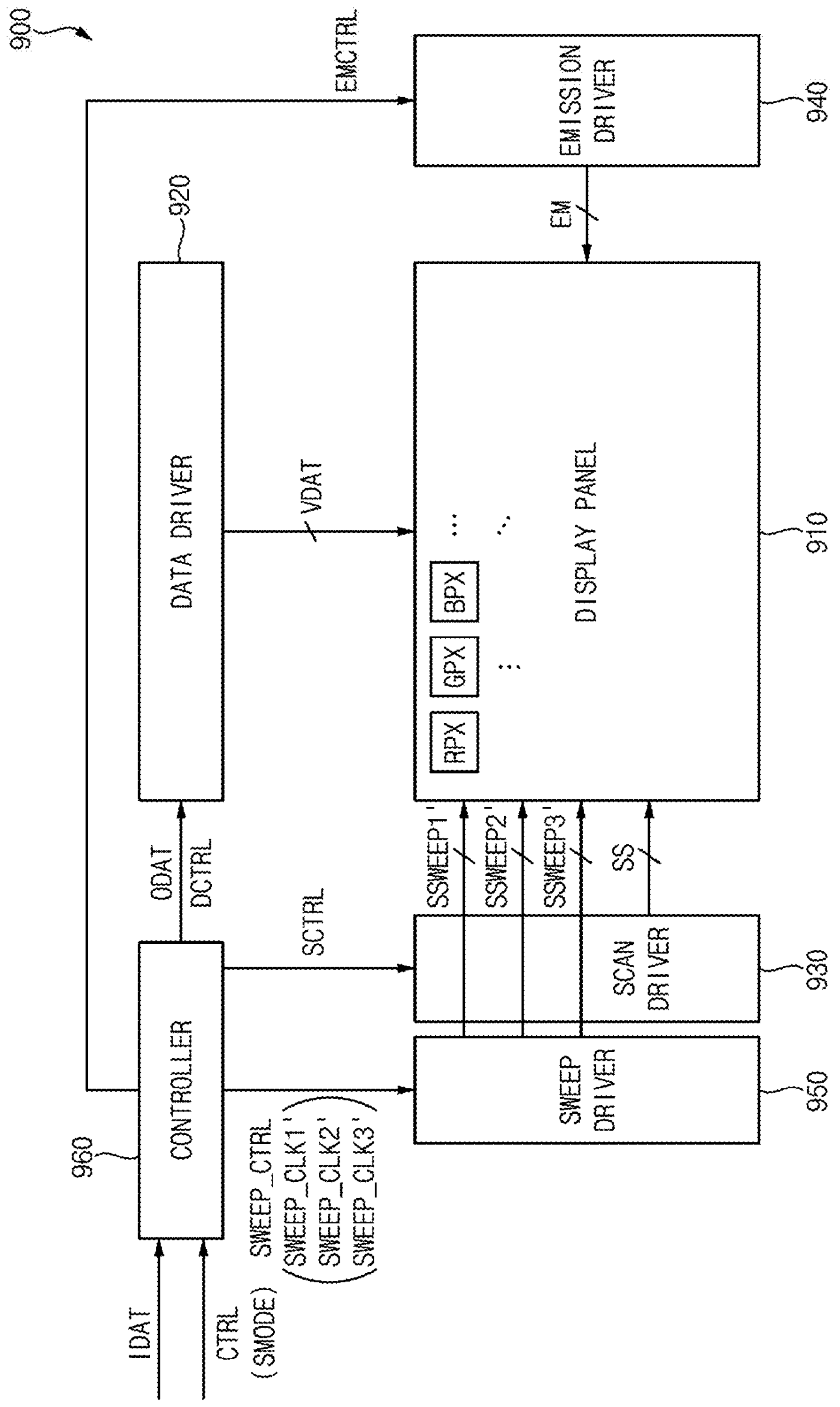
FIG. 17 is a schematic block diagram illustrating a display device according to embodiments.

FIG. 17 is a schematic block diagram illustrating a display device according to embodiments.

Referring to FIG. 17, a display device 900 according to embodiments may include a display panel 910, a data driver 920, a scan driver 930, an emission driver 940, a sweep driver 950 and a controller 960. The display device 900 of FIG. 17 may have a similar configuration and a similar operation to a display device 700 of FIG. 12, except that each of first, second, and third sweep signals SSWEEP1', SSWEEP2', and SSWEEP3' applied to red, green, and blue pixels RPX, GPX, and BPX may be changed in multiple modes indicated by a mode signal SMODE.

The sweep driver 950 may generate the first, second, and third sweep signals SSWEEP1', SSWEEP2', and SSWEEP3' having different slopes based on first, second, and third sweep clock signals SWEEP_CLK1', SWEEP_CLK2', and SWEEP_CLK3' having different clock periods, and may provide the first, second, and third sweep signals SSWEEP1', SSWEEP2', and SSWEEP3' to the red, green, and blue pixels RPX, GPX, and BPX, respectively.

The controller 960 may receive the mode signal SMODE (e.g., control signal CTRL) indicating one of multiple modes having different maximum luminances. In case that a mode indicated by the mode signal SMODE is changed, the controller 960 may change clock periods of the first, second, and third sweep clock signals SWEEP_CLK1', SWEEP_CLK2', and SWEEP_CLK3'. The sweep driver 950 may change slopes of the first, second, and third sweep signals SSWEEP1', SSWEEP2', and SSWEEP3' based on the first, second, and third sweep clock signals SWEEP_CLK1', SWEEP_CLK2', and SWEEP_CLK3' having the changed clock periods. For example, in a case where the mode indicated by the mode signal SMODE is changed from a first mode having a first maximum luminance to a second mode having a second maximum luminance lower than the first maximum luminance, the controller 960 may decrease the clock periods of the first, second and third sweep clock signals SWEEP_CLK1', SWEEP_CLK2', and SWEEP_CLK3', and the sweep driver 950 may increase absolute values of slopes of the first, second and third sweep signals SSWEEP1', SSWEEP2' and SSWEEP3' based on the first, second, and third sweep clock signals SWEEP_CLK1', SWEEP_CLK2', and SWEEP_CLK3' having the decreased clock periods. In this case, falling times of currents of the red, green, and blue pixels RPX, GPX, and BPX are reduced, luminous efficiency of the red, green, and blue pixels RPX, GPX, and BPX may be improved, and an image quality of the display device 900 may be improved.

Figure 18:
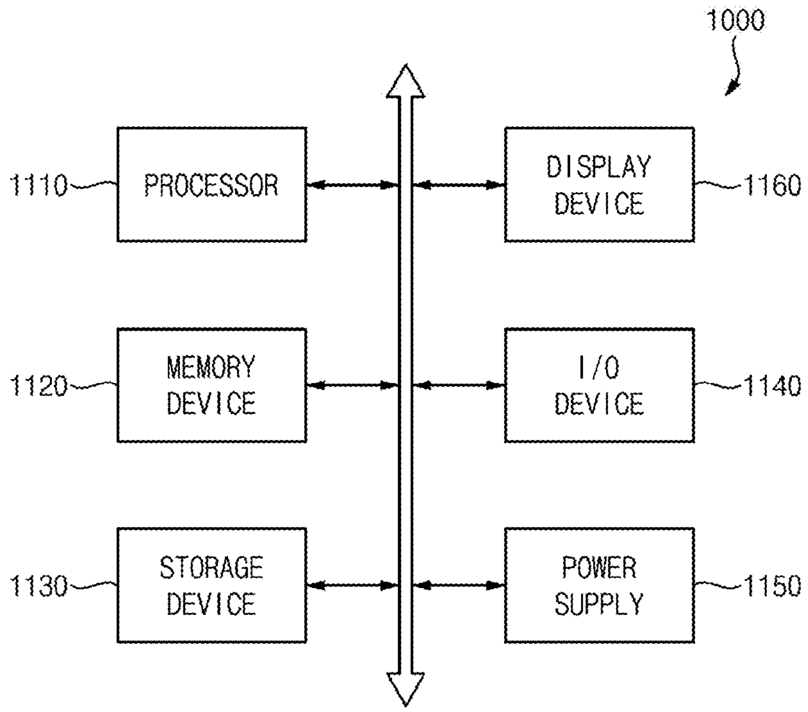
FIG. 18 is a schematic block diagram illustrating an electronic device including a display device according to embodiments.

FIG. 18 is a schematic block diagram illustrating an electronic device including a display device according to embodiments.

Referring to FIG. 18, an electronic device 1000 may include a processor 1110, a memory device 1120, a storage device 1130, an input/output (I/O) device 1140, a power supply 1150, and a display device 1160. The electronic device 1000 may further include multiple ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. In other embodiments, the processor 1110 may be further coupled to an extended bus such as a peripheral component interconnection (PCI) bus.

The memory device 1120 may store data for operations of the electronic device 1000. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1000. The display device 1160 may be coupled to other components through the buses or other communication links.

In the display device 1160, each pixel may emit light based on a sweep signal, and a slope of the sweep signal may be changed in multiple modes having different maximum luminances. In other embodiments, red, green and blue pixels may emit light based on sweep signals having different slopes. Accordingly, luminous efficiency of each pixel may be improved, and an image quality of the display device 1160 may be improved.

The disclosure may be applied to any display device 1160 and any electronic device 1000 including the display device 1160. For example, the disclosure may be applied to a smart phone, a wearable electronic device, a mobile phone, a television (TV) (e.g., a digital TV, a 3D TV, etc.), a personal computer (PC) (e.g., a tablet computer, a laptop computer, etc.), a home appliance, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included in the scope of the disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included in the scope of the appended claims.

What is claimed is:

1. A display device comprising:
- a display panel including a plurality of pixels;
- a data driver which provides a data voltage to each of the plurality of pixels;
- a scan driver which provides a scan signal to each of the plurality of pixels;
- a sweep driver which provides a sweep signal to each of the plurality of pixels; and
- a controller which controls the data driver, the scan driver and the sweep driver,
- wherein each of the plurality of pixels includes:
  - a light emitting element;
  - a pulse width modulation circuit which receives the data voltage in response to the scan signal and generates a pulse width modulation signal based on the data voltage and the sweep signal; and
  - a current generation circuit which provides a current to the light emitting element based on the pulse width modulation signal, and
- a slope of the sweep signal is changed in a plurality of modes having different maximum luminances.

2. The display device of claim 1, wherein the plurality of modes includes a first mode having a first maximum luminance, and a second mode having a second maximum luminance lower than the first maximum luminance, and
- the sweep signal has a first slope in the first mode and has a second slope having an absolute value greater than an absolute value of the first slope in the second mode.

3. The display device of claim 1, wherein the sweep signal gradually changes in a sweep period in each frame period, and
- the sweep period includes different time lengths in the plurality of modes.

4. The display device of claim 3, wherein the plurality of modes includes a first mode having a first maximum luminance, and a second mode having a second maximum luminance lower than the first maximum luminance, and
- the sweep period has a first time length in the first mode and has a second time length shorter than the first time length in the second mode.

5. The display device of claim 4, wherein, in the first mode, the sweep signal gradually changes from a first voltage level to a second voltage level during the sweep period having the first time length, and
- in the second mode, the sweep signal gradually changes from the first voltage level to the second voltage level during the sweep period having the second time length.

6. The display device of claim 1, wherein the sweep driver generates the sweep signal based on a sweep clock signal, and
- the sweep clock signal has different clock periods in the plurality of modes.

7. The display device of claim 6, wherein the plurality of modes includes a first mode having a first maximum luminance, and a second mode having a second maximum luminance lower than the first maximum luminance, and
- the sweep clock signal has a first clock period in the first mode, and has a second clock period shorter than the first clock period in the second mode.

8. The display device of claim 1, wherein the plurality of modes includes:
- a high brightness mode (HBM) having a first maximum luminance;
- a normal mode having a second maximum luminance lower than the first maximum luminance; and
- an always on display (AOD) mode having a third maximum luminance lower than the second maximum luminance.

9. The display device of claim 1, wherein the plurality of pixels includes a red pixel, a green pixel, and a blue pixel, and
- a first sweep signal applied to the red pixel, a second sweep signal applied to the green pixel and a third sweep signal applied to the blue pixel have different slopes.

10. The display device of claim 9, wherein an absolute value of a slope of the second sweep signal is greater than an absolute value of a slope of the third sweep signal, and
- an absolute value of a slope of the first sweep signal is greater than the absolute value of the slope of the second sweep signal.

11. A display device comprising:
- a display panel including a red pixel, a green pixel, and a blue pixel;
- a data driver which provides a data voltage to each of the red pixel, the green pixel and the blue pixel;
- a scan driver which provides a scan signal to each of the red pixel, the green pixel and the blue pixel;
- a sweep driver which provides a first sweep signal to the red pixel, provides a second sweep signal to the green pixel and provides a third sweep signal to the blue pixel; and
- a controller which controls the data driver, the scan driver, and the sweep driver,
- wherein each of the red pixel, the green pixel, and the blue pixel includes:
  - a light emitting element;
  - a pulse width modulation circuit which receives the data voltage in response to the scan signal and generates a pulse width modulation signal based on the data voltage and a corresponding one of the first, second, and third sweep signals; and
  - a current generation circuit which provides a current to the light emitting element based on the pulse width modulation signal, and
- the first sweep signal, the second sweep signal, and the third sweep signal include different slopes.

12. The display device of claim 11, wherein an absolute value of a slope of the second sweep signal is greater than an absolute value of a slope of the third sweep signal, and
- an absolute value of a slope of the first sweep signal is greater than the absolute value of the slope of the second sweep signal.

13. The display device of claim 11, wherein a first sweep period in which the first sweep signal gradually changes, a second sweep period in which the second sweep signal gradually changes, and a third sweep period in which the third sweep signal gradually changes include different time lengths.

14. The display device of claim 13, wherein a time length of the second sweep period is shorter than a time length of the third sweep period, and a time length of the first sweep period is shorter than the time length of the second sweep period.

15. The display device of claim 13, wherein the third sweep signal gradually changes from a first voltage level to a second voltage level during the third sweep period, the second sweep signal gradually changes from the first voltage level to the second voltage level during the second sweep period having a time length shorter than a time length of the third sweep period, and the first sweep signal gradually changes from the first voltage level to the second voltage level during the first sweep period having a time length shorter than the time length of the second sweep period.

16. The display device of claim 11, wherein the sweep driver generates the first sweep signal based on a first sweep clock signal, generates the second sweep signal based on a second sweep clock signal, and generates the third sweep signal based on a third sweep clock signal, and the first sweep clock signal, the second sweep clock signal, and the third sweep clock signal have different clock periods.

17. The display device of claim 16, wherein a clock period of the second sweep clock signal is shorter than a clock period of the third sweep clock signal, and a clock period of the first sweep clock signal is shorter than the clock period of the second sweep clock signal.

18. The display device of claim 11, wherein a slope of each of the first sweep signal, the second sweep signal, and the third sweep signal is changed in a plurality of modes having different maximum luminances.

19. The display device of claim 18, wherein the plurality of modes includes a first mode having a first maximum luminance, and a second mode having a second maximum luminance lower than the first maximum luminance, and each of the first sweep signal, the second sweep signal, and the third sweep signal has a first slope in the first mode, and has a second slope having an absolute value greater than an absolute value of the first slope in the second mode.

20. An electronic device comprising:

a processor configured to provide input image data; and a display device configured to receive the input image data from the processor, and to display an image based on the input image data, the display device comprising:

a display panel including a red pixel, a green pixel, and a blue pixel;

a data driver which provides a data voltage to each of the red pixel, the green pixel, and the blue pixel;

a scan driver which provides a scan signal to each of the red pixel, the green pixel, and the blue pixel;

a sweep driver which provides a first sweep signal having a first slope to the red pixel, provides a second sweep signal having a second slope different from the first slope to the green pixel, and provides a third sweep signal having a third slope different from the first and second slopes to the blue pixel; and a controller which controls the data driver, the scan driver, and the sweep driver, wherein each of the red pixel, the green pixel, and the blue pixel includes:

a light emitting element;

a pulse width modulation circuit which receives the data voltage in response to the scan signal and generates a pulse width modulation signal based on the data voltage and a corresponding one of the first, second and third sweep signals; and a current generation circuit which provides a current to the light emitting element based on the pulse width modulation signal, and the first slope of the first sweep signal, the second slope of the second sweep signal, and the third slope of the third sweep signal are changed in a plurality of modes having different maximum luminances.

* * * * *